US012124539B2

(12) United States Patent
Aggarwal et al.

(10) Patent No.: US 12,124,539 B2
(45) Date of Patent: *Oct. 22, 2024

(54) MACHINE LEARNING TECHNIQUES FOR DIFFERENTIABILITY SCORING OF DIGITAL IMAGES

(71) Applicant: Adobe Inc., San Jose, CA (US)

(72) Inventors: Arshiya Aggarwal, Delhi (IN); Sanjeev Tagra, Redmond, WA (US); Sachin Soni, Delhi (IN); Ryan Rozich, Austin, TX (US); Prasenjit Mondal, West Bengal (IN); Jonathan Roeder, Round Rock, TX (US); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,641

(22) Filed: Jun. 23, 2023

(65) Prior Publication Data

US 2023/0334121 A1    Oct. 19, 2023

Related U.S. Application Data

(63) Continuation of application No. 17/021,279, filed on Sep. 15, 2020, now Pat. No. 11,748,451.

(51) Int. Cl.
*G06F 18/22* (2023.01)
*G06F 18/2113* (2023.01)
(Continued)

(52) U.S. Cl.
CPC .......... *G06F 18/22* (2023.01); *G06F 18/2113* (2023.01); *G06N 5/04* (2013.01);
(Continued)

(58) Field of Classification Search
CPC ..... G06F 18/22; G06F 18/2113; G06V 10/40; G06N 5/04; G06T 5/50; G06T 2207/20081; G06T 2207/20084
See application file for complete search history.

(56) References Cited

U.S. PATENT DOCUMENTS 8,370,282 B1    2/2013  Leung
8,831,358 B1 *  9/2014  Song ...................... G06F 18/24
                                                    382/218
(Continued)

OTHER PUBLICATIONS

"Ocampor/image-quality", https://github.com/ocampor/image-quality.
(Continued)

*Primary Examiner* — Gregory M Desire
(74) *Attorney, Agent, or Firm* — Kilpatrick Townsend & Stockton LLP

(57) ABSTRACT

An image differentiation system receives input feature vectors for multiple input images and reference feature vectors for multiple reference images. In some cases, the feature vectors are extracted by an image feature extraction module trained based on training image triplets. A differentiability scoring module determines a differentiability score for each input image based on a distance between the input feature vectors and the reference feature vectors. The distance for each reference feature vector is modified by a weighting factor based on interaction metrics associated with the corresponding reference image. In some cases, an input image is identified as a differentiated image based on the corresponding differentiability score. Additionally or alternatively, an image modification module determines an image modification that increases the differentiability score of the input image. The image modification module generates a recommended image by applying the image modification to the input image.

20 Claims, 8 Drawing Sheets

(51) Int. Cl.
*G06N 5/04* (2023.01)
*G06T 5/50* (2006.01)
*G06V 10/40* (2022.01)

(52) U.S. Cl.
CPC ............... *G06T 5/50* (2013.01); *G06V 10/40* (2022.01); *G06T 2207/20081* (2013.01); *G06T 2207/20084* (2013.01)

(56) References Cited

U.S. PATENT DOCUMENTS

| | | | | |
|---|---|---|---|---|
| 10,614,342 | B1* | 4/2020 | Lorbert | G06V 10/764 |
| 10,678,846 | B2 | 6/2020 | Gordo Soldevila | |
| 11,042,776 | B1* | 6/2021 | Buhler | H04N 1/00018 |
| 11,072,352 | B2 | 7/2021 | Coseglia | |
| 11,132,780 | B2* | 9/2021 | Xie | G01S 17/06 |
| 11,176,424 | B2* | 11/2021 | Seo | G06V 10/40 |
| 11,475,684 | B1 | 10/2022 | Deng | |
| 11,669,945 | B2* | 6/2023 | Tan | G06V 10/772 382/156 |
| 11,756,291 | B2* | 9/2023 | Turkelson | G06V 30/19173 |

OTHER PUBLICATIONS

Beggel et al., "Robust Anomaly Detection in Images using Adversarial Autoencoders", Bosch Center for Artificial Intelligence, Renningen, Germany, Department of Statistics, Ludwig-Maximilians-University Munich, Munich, Germany.
Chaudhuri et al., "A Smart System for Selection of Optimal Product Images in E-Commerce", https://ieeexplore.ieee.org/stamp/stamp.jsp? arnumber=8622259.
Garg et al., "Sales Potential: Modelling Sellability of Visual Aesthetics of a Fashion Product", 2016.
Kim et al., "Deep CNN-Based Blind Image Quality Predictor", 2162-237X © 2018 IEEE, Jan. 2019, pp. 11-24.
Ma et al., "Understanding Image Quality and Trust in Peer-to-Peer Marketplaces", Cornell Tech, Nov. 26, 2018.
Perera et al., "OCGAN: One-class Novelty Detection Using GANs with Constrained Latent Representations", AWS A1, Mar. 20, 2019.
Sabokrou et al., "Adversarially Learned One-Class Classifier for Novelty Detection", Institute for Research in Fundamental Sciences Amirkabir University of Technology Stanford University, 3379-3388.
Sarafijanovic-Djukic et al., "Fast Distance-Based Anomaly Detection in Images Using an Inception-Like Autoencoder", IRIS Technology Solutions, Barcelona Spain, 2019.
Wang et al., "Learning Fine-grained Image Similarity with Deep Ranking", Northwestern University Google Inc., California Institute of Technology, Apr. 17, 2014.
Office Action, U.S. Appl. No. 17/021,279, issued Nov. 25, 2022.
Notice of Allowance, U.S. Appl. No. 17/021,279, issued Apr. 13, 2023.

* cited by examiner

MACHINE LEARNING TECHNIQUES FOR DIFFERENTIABILITY SCORING OF DIGITAL IMAGES

RELATED APPLICATIONS

The present application is a continuation of U.S. application Ser. No. 17/021,279 entitled "Machine Learning Techniques for Differentiability Scoring of Digital Images," filed Sep. 15, 2020, which is incorporated by reference here in its entirety.

TECHNICAL FIELD

This disclosure relates generally to the field of machine learning, and more specifically relates to creating or selecting a visually distinctive image by applying techniques for differentiability scoring to one or more input images.

BACKGROUND

Online content distribution platforms are used to distribute content items or services. In some cases, a user of such a content distribution platform selects digital images to represent available content items, such as digital photos of a product or other content item. If the content distribution platform receives a query matching the product or other content item, the content distribution platform responds to the query by presenting these user-selected digital images. However, digital images selected by a particular user are often displayed alongside hundreds or thousands of additional digital images representing comparable content items from other users of the online content distribution platform, where few visual features of the various images provide any differentiation among the images. Thus, digital images selected by the particular user are often difficult to distinguish, from a casual glance, from other digital images from other users that are presented in response to a query. Furthermore, existing content editing tools, which rely on subjective judgments of a user regarding characteristics that differentiate the user's image from other available images, provide limited utility for modifying the user's image in a way that will distinguish the image from the large quantity of digital images available via online content distribution platforms.

SUMMARY

According to certain embodiments, an image differentiation system includes one or more of an image feature extraction module, a differentiability scoring module, or an image modification module. The image feature extraction module generates an input feature vector of an input image. The input feature vector is extracted from the input image by applying a feature extraction neural network to the input image. The differentiability scoring module accesses a reference image having a reference feature vector and associated user interaction metrics. The differentiability scoring module determines a distance between the input feature vector and the reference feature vector. The differentiability scoring module determines a differentiability score of the input image by applying a weighting factor to the distance. The weighting factor is based on the associated user interaction metrics of the reference image. The differentiability score indicates an estimated visual difference of the input image with respect to the reference image. In some cases, the input image is identified as a differentiated image based on the differentiability score. For example, the input image is identified as a differentiated image based on the differentiability score exceeding a threshold relationship with additional differentiability scores of additional input images. The image modification module determines an image modification that increases the differentiability score of the input image. The image modification module generates a recommended image by applying the image modification to the input image. A modified differentiability score for the recommended image indicates an improved visual difference of the recommended image with respect to the input image.

According to certain embodiments, an image deep ranking model used by an image differentiation system is trained. Training the image deep ranking model includes selecting a group of training images from a library of images. A training triplet is generated that includes a query image, a positive image, and a negative image from the group of training images. The query image has a query feature vector. The positive image has a positive feature vector and a first similarity index. The first similarity index indicates a visual similarity of the positive image with respect to the query image. The negative image has a negative feature vector and a second similarity index. The second similarity index indicates a visual dissimilarity of the negative image with respect to the query image. The image deep ranking model is trained based on a combination of the query feature vector, the positive feature vector, and the negative feature vector. The image deep ranking model is trained to identify an additional feature vector of an additional image that is received by the image differentiation system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
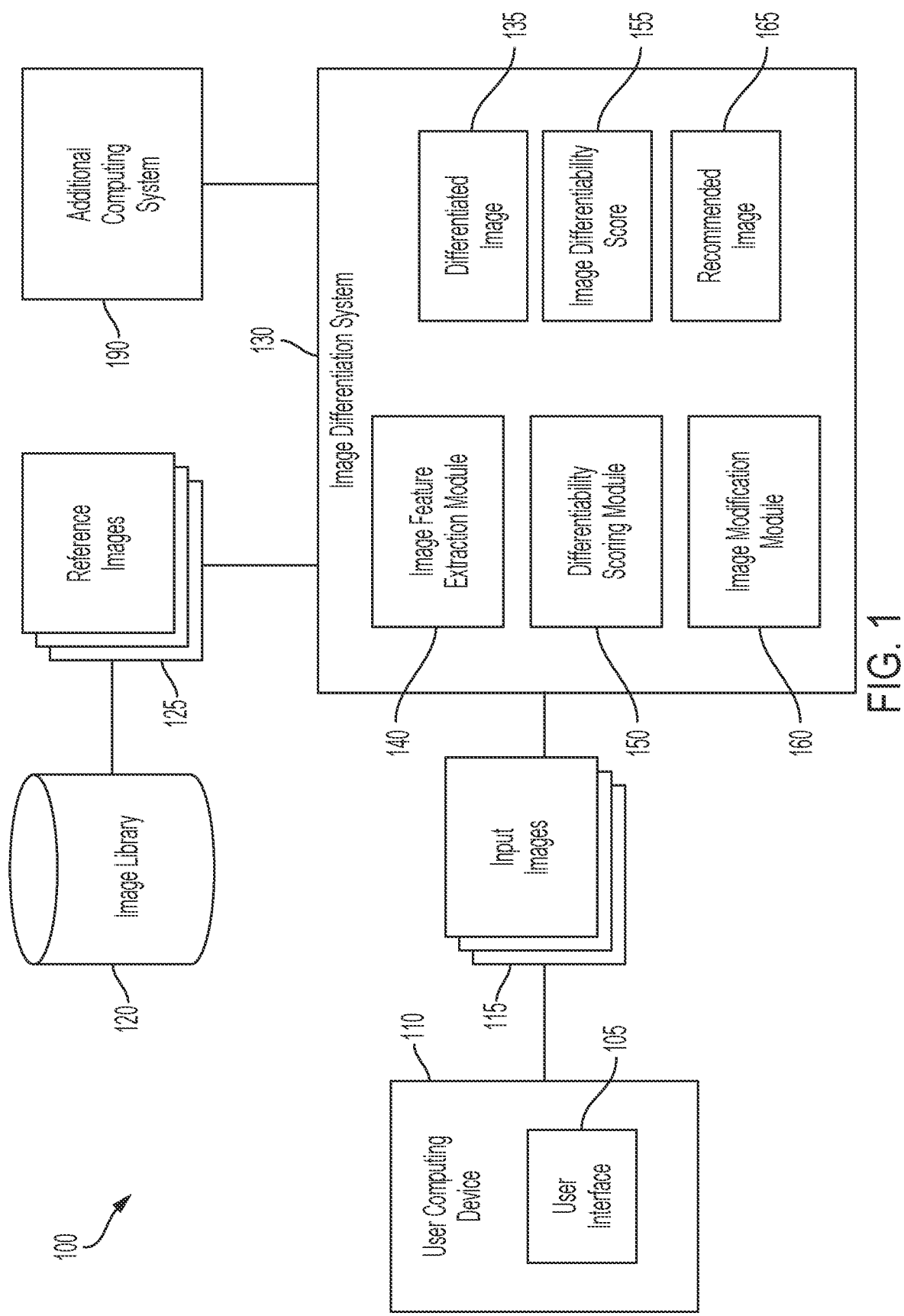
FIG. 1 is a diagram depicting an example of a computing environment in which an image differentiation system identifies a differentiated image, according to certain embodiments.

As discussed above, contemporary technological tools available within an online content distribution platform often provide insufficient assistance to a user who wishes to generate or select online content that is visually distinctive as compared to other users' content. Certain described embodiments address these deficiencies by, for example, using machine learning techniques to determine a differentiability score indicating the visual distinctiveness of a digital image with respect to other digital images, which facilitates modification or selection of digital image content with increased visual distinctiveness. For instance, an image differentiation system that utilizes the machine learning techniques described herein generates a recommended modification for a digital image that improves a differentiability score for the digital image.

The following example is provided to introduce certain embodiments of the present disclosure. In this example, an image differentiation system receives an input image, such as an image depicting a black handbag. The image of the handbag is uploaded to the image differentiation system, for example, by a user of an online content distribution platform. The image differentiation system executes a differentiability scoring module that computes a differentiability score for the input image. The differentiability score indicates differences between the input image and a group of reference images, such as visual distinctions between the black handbag and visually similar handbags depicted by the reference images.

To calculate the differentiability score, the differentiability scoring module generates feature vectors for the input image and the reference images. The differentiability scoring module calculates distances between the feature vector of the input image and feature vectors for each of the reference images. In some cases, the differentiability scoring module also calculates weighting factors for the reference feature vectors, where the weighting factors represent respective amounts of historical user interactions with the reference images. The differentiability scoring module calculates a differentiability score of the input image is determined based on the distances and the weighting factors. For instance, in the example above involving the input image of the black handbag and a reference image of an additional black handbag, visually similar features of the input image and the reference image (e.g., both bags having a black color, both bags having a narrow strap) will have a relatively short distance between the feature vectors, while visually distinct features of the images (e.g., a bag having a zipper pocket compared to a bag having a clasp) will have a relatively long distance. A larger distance between the feature vector of the input image and the feature vector of the reference image increases the differentiability score, since the distance indicates greater visual distinctiveness between the input and reference images. Furthermore, in the example above involving the handbag images, the reference image's feature vector could have a larger weighting factor because more users have historically clicked on the image of the additional black handbag, as compared to clicks on additional reference images of other handbags. A larger weighting factor for the reference image increases the differentiability score, since the increased interactions with the reference image (e.g., more clicks) indicate that users find the reference image appealing.

In some embodiments, the image differentiation system also generates a modification recommendation that improves the differentiability score of the input image. For instance, an image modification module of the image differentiation system computes an average of the reference feature vectors. The image modification module also computes, for each reference feature vector, a distance between the reference feature vector and a point defined by the averaged reference feature vectors. For each of the reference images, the image modification module determines a recommendation score that indicates the distance between the averaged reference feature vectors and the reference feature vector associated with a particular reference image. The recommendation score indicates a visual distinctiveness of the particular reference image as compared to the average visual distinctiveness of the group of reference images. The image modification module selects at least one reference image having, for example, a higher recommendation score indicating the selected reference image has a relatively high visual distinctiveness compared to the group of reference images. The image modification module determines and suggests an image modification for the input image that would increase the differentiability score of the input image, such as a modification that includes at least one distinctive feature of the selected reference image.

As used herein, the terms "image" and "digital image" refer to graphical digital content that visually depicts a graphical representation of subject matter. For example, an image uses pixels or vector-based graphics to represent a depiction of subject matter (e.g., people, landscape, objects, animals). Examples of a digital image include, without limitation, a digitized photograph, an electronic version of a hand-drawn design, a graphic created with drawing software, or any other suitable graphical data that represents visual subject matter.

As used herein, the term "feature" refers to a graphical quality of an image. An image can include features describing graphical qualities or contextual qualities of the image, such as brightness, contrast, color, directional edges (e.g., vertical, horizontal, diagonal edges), textures depicted in the image, image resolution, spatial relationships of depicted objects, semantic content, or other suitable features on a digital image. As used herein, the terms "vector" and "feature vector" refer to a quantitative representation of information describing image features.

As used herein, the term "neural network" refers to one or more computer-implemented networks capable of being trained to achieve a goal. Unless otherwise indicated, references herein to a neural network include one neural network or multiple interrelated neural networks that are trained together. In some cases, a neural network (or a component of a neural network) produces output data, such as data indicating image features, data indicating similarities or differences between images, a score associated with an image, or other suitable types of data. Examples of neural networks include, without limitation, a deep learning model, a deep ranking model, a convolutional neural network (CNN), a deep CNN, and other types of neural networks.

As used herein, the terms "differentiation" or "differentiability" refer to a characteristic of difference between a digital image (or other data structure) and other digital images. A differentiated image, for example, is a digital image having visual qualities that distinguish it from other digital images. In some cases, differentiability for a digital image is determined based on relative relationships between a digital image and one or more reference digital images. For example, a digital image depicting a pair of black shoes may be highly differentiated from reference digital images depicting pairs of brown shoes. However, the digital image depicting the pair of black shoes may have lower differentiation as compared to reference digital images depicting other pairs of black shoes. In some cases, differentiation arises from characteristics of a digital image, such as visual characteristics indicated by features or a feature vector of the digital image. Although differentiation and differentiability are generally described herein with respect to digital images, it will be understood that the techniques described herein could be applied to other types of data structures, such as digital sounds, digital objects (e.g., 3D models), or other types of data structures that may be used to represent content, such as content in an online content distribution platform.

Certain embodiments provide improvements over existing software tools for creating or selecting visually distinctive image content for inclusion in an online content distribution platform. For instance, generating an image modification recommendation involves applying particular rules to data representing reference images, such as calculating multiple recommendation scores relative to an average feature vector that is generated by applying a feature extraction neural network. Other embodiments use the differentiability scoring techniques described herein to facilitate selection of visually distinctive image content by quantifying a degree of visual differentiation of a given digital image from additional digital images. For example, determining a differentiability score of an input image involves applying particular rules to data representing the input image, such as generating feature vectors by applying a feature extraction neural network. In addition, determining a differentiability score of an input image involves generating new data, such as by performing a differentiability scoring technique to combine data representing distances between feature vectors with data representing user interaction metrics. Thus, embodiments described herein improve computer-implemented processes for creating or selecting image content via techniques to determine a differentiability score indicating visual distinctiveness, thereby providing a more suitable solution for automating tasks previously performed by humans.

In some cases, techniques described herein improve a user's access to digital content available within an online content distribution platform. For example, a user may be more readily able to identify relevant electronic content after receiving visually distinctive image content that is identified by automated differentiability scoring techniques. For example, the visually distinctive image content can improve the user's accessibility to the electronic content among hundreds or thousands of additional image content items. In some cases, the presence of hundreds or thousands of visually similar image content items can be an aspect of an online content distribution platform that is specific to online computing environments.

Referring now to the drawings, FIG. 1 is a diagram depicting an example of a computing environment 100, in which an image differentiation system 130 identifies a differentiated image 135 from a group of one or more input images 115. The computing environment 100 includes one or more of the image differentiation system 130, a user computing device 110, an image library 120, and an additional computing system 190. In some implementations, the image differentiation system 130 may receive the input images 115 from the user computing device 110. For example, a person associated with the user computing device 110 may indicate one or more of the input images 115 via a user interface 105 of the user computing device 110. In some cases, the input images 115 can be selected by the person as candidate images for representing one or more electronic content items that are available in the computing environment 100. As a non-limiting example, the additional computing system 190 could be an online content distribution system that includes a large group of electronic content items indicating products or services provided by multiple users of the additional computing system 190. In this example, the input images 115 could be candidate images for representing one or more products or services provided by the person who is associated with the user computing device 110.

In some embodiments, the image differentiation system 130 receives the input images 115, such as via the user computing device 110. Additionally or alternatively, the image differentiation system 130 receives a group of one or more reference images 125. For example, the reference images 125 are received from an image library 120. In some cases, the image library 120 is associated with the additional computing system 190. For example, the image library 120 could include a catalog of digital images that are associated with electronic content items available via the additional computing system 190.

In FIG. 1, the image differentiation system 130 includes one or more of an image feature extraction module 140, a differentiability scoring module 150, or an image modification module 160. In some cases, the image feature extraction module 140 includes one or more neural networks that are trained to extract features from a digital image. For example, an image deep ranking model in the image feature extraction module 140 is trained to extract image features from one or more of the input images 115 or the reference images 125. Additionally or alternatively, the image feature extraction module 140 (or an included neural network) is trained to generate a feature vector based on the extracted image features. For example, the image feature extraction module 140 generates input feature vectors that are associated with the input images 115. Additionally or alternatively, the image feature extraction module 140 generates reference feature vectors that are associated with the reference images 125.

In some embodiments, the differentiability scoring module 150 determines one or more differentiability scores, such as an image differentiability score 155, associated with the input images 115. Each particular differentiability score for a particular input image is calculated based on the input feature vector for the particular input image and the reference feature vectors for the reference images 125. For example, the differentiability scoring module 150 calculates the particular differentiability score by determining a distance between the particular input feature vector and the reference feature vectors. Using the differentiability scores for the input images 115, the image differentiation system 130 identifies one or more differentiated images, such as a differentiated image 135. The differentiated image 135 is identified, for example, responsive to a determination that the associated image differentiability score 155 indicates a relatively high differentiability of the associated input image, as compared to additional differentiability scores of additional input images. In some cases, one or more of the differentiated image 135 or the image differentiability score 155 are provided to one or more of the additional computing system 190 or the user computing device 110. For example, the user interface 105 is updated to display (or otherwise indicate) the differentiated image 135 or the image differentiability score 155. Additionally or alternatively, the additional computing system 190 modifies an electronic content item based on the differentiated image 135, such as by updating the electronic content item to be represented by the differentiated image 135.

In FIG. 1, the image differentiation system 130 generates a recommended image 165 for the differentiated image 135 or an additional one of the input images 115. For example, the image modification module 160 generates image modification data for the differentiated image 135. The image modification data indicates one or more of a modification recommendation, a recommendation score, a reference image (such as a particular one of the reference images 125), or additional data describing a modification that is recommended for the differentiated image 135. In some cases, the image modification module 160 generates the recommended image 165 based on a combination of the differentiated image 135 and the particular reference image indicated by the modification data, such as a combination image that includes the differentiated image 135 modified by the particular reference image. Additionally or alternatively, the image differentiation system 130 provides one or more of the recommended image 165 or the image modification data to one or more of the user computing device 110 or the additional computing system 190. For example, the user interface 105 is updated to display (or otherwise indicate) the recommended image 165 or additional modifications indicated by the image modification data.

Figure 2:
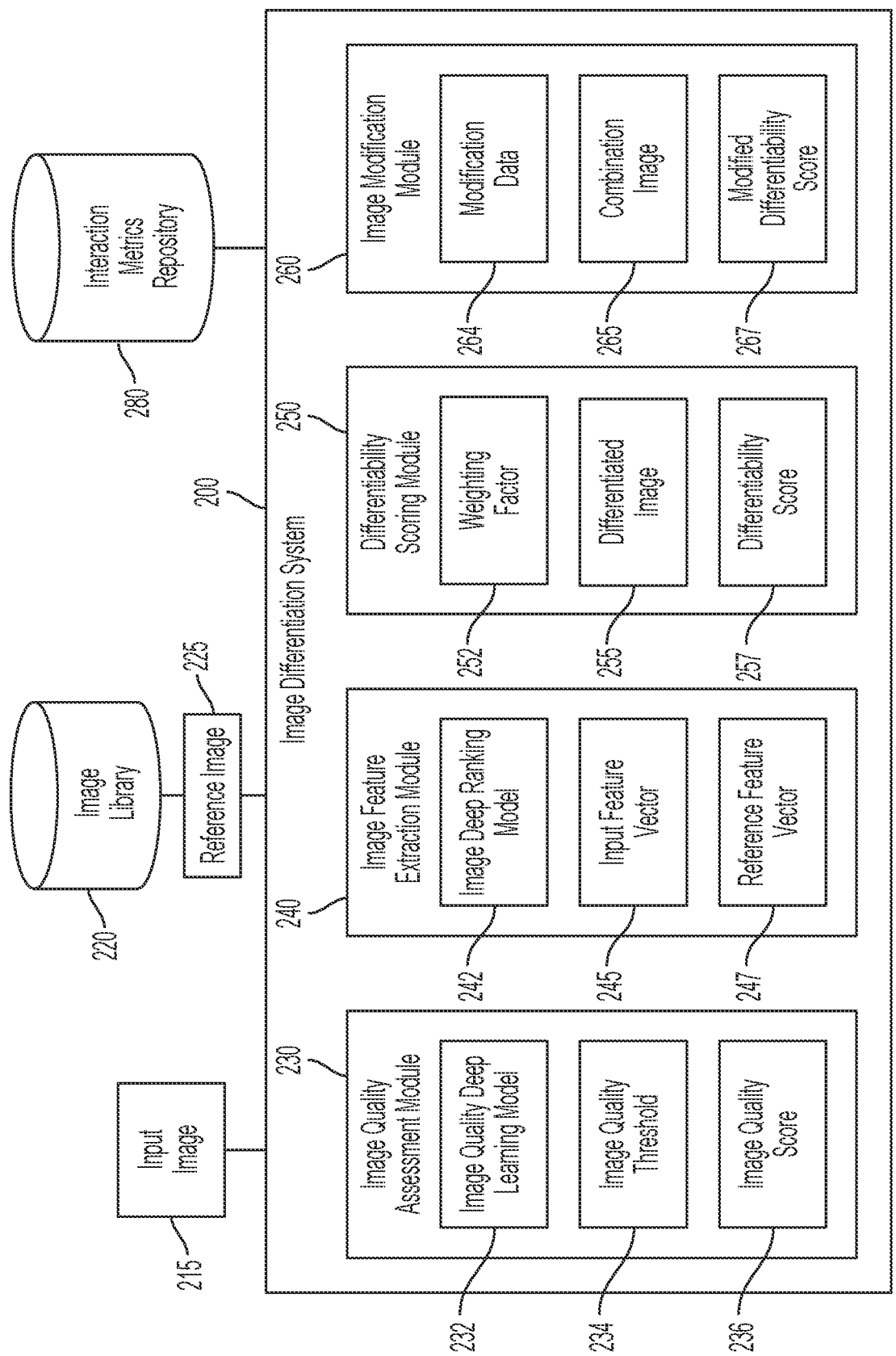
FIG. 2 is a diagram depicting an example of an image differentiation system configured for differentiation analysis of input images, according to certain embodiments.

In some embodiments, an image differentiation system includes one or more neural networks that are trained to analyze digital images received by the image differentiation system. Neural networks included in an image differentiation system can include, without limitation, deep learning models, deep ranking models, CNN, or any other suitable type of neural network. FIG. 2 is a diagram depicting an example of an image differentiation system 200 that is configured for differentiation analysis of one or more input images. The image differentiation system 200 includes one or more neural networks that are trained to perform analysis of an input image 215 received by the image differentiation system 200. The image differentiation system 200 includes one or more of an image quality assessment module 230, an image feature extraction module 240, a differentiability scoring module 250, or an image modification module 260. In some cases, the image differentiation system 200 is configured to communicate with one or more additional computing systems (e.g., as described in regards to FIG. 1), such as the user computing device 110 or the additional computing system 190.

In some embodiments, the image differentiation system 200 is configured to communicate with one or more of an image library 220 or an interaction metrics repository 280. In some cases, the image library 220 includes multiple digital images included in an online content distribution platform, such as a catalog of reference images associated with electronic content items indicating products or services available via the online content distribution platform. Additionally or alternatively, the interaction metrics repository 280 includes data describing user interactions with one or more of the digital images included in the image library 220. As a non-limiting example, if the image library 220 includes a catalog of reference images associated with electronic content items in the online content distribution platform, the interaction metrics repository 280 may include interaction metrics indicating interactions of users with the reference images or the associated electronic content items. The interaction metrics can include data describing, for example, a frequency or quantity of interactions (e.g., click-throughs), a frequency or quantity of conversions (e.g., purchase, download, account generation), a frequency or quantity of communications (e.g., posting a comment, sending an email, joining a chat), or any other suitable data describing user interactions with the reference images or the associated electronic content items.

In FIG. 2, the image differentiation system 200 receives one or more input images, including the input image 215, and one or more reference images, including a reference image 225. For example, the input image 215 is received from a user computing device, such as the user computing device 110 via the user interface 105. Additionally or alternatively, the reference image 225 is received from the image library 220. The image quality assessment module 230 applies a trained image quality deep learning model 232 to one or more of the input image 215 or the reference image 225. The image quality deep learning model 232 is trained to generate an image quality score for a digital image, such as an image quality score 236 associated with the input image 215. In some cases, the image quality deep learning model 232 includes one or more convolutional layers that are configured to identify quality features of the digital image. Quality features identified by the deep learning model 232 can include one or more of blur, overexposure, image resolution, color transformations, noise, geometric distortion, or any other feature indicating a photographic quality of the digital image. As a non-limiting example, the image quality deep learning model 232 can include a blind/referenceless image spatial quality evaluator ("BRISQUE"), but other types of neural networks, including other types of deep learning models, may be used.

In some embodiments, the image quality assessment module 230 compares the image quality score 236 to an image quality threshold 234. Additionally or alternatively, the image quality assessment module 230 determines that the image quality score 236 fulfills the image quality threshold 234 (e.g., meets or exceeds the quality threshold 234). For example, the image differentiation system 200 can determine that the input image 215 has sufficient quality to be a candidate for a differentiated image, based on the score 236. In some cases, the image quality assessment module 230 determines an additional quality score for the reference image 225 and compares the additional quality score to the quality threshold 234 (or an additional image quality threshold). Based on the additional quality score, the image differentiation system 200 can determine that the reference image 225 has sufficient quality to be used in differentiability analysis for the input image 215. In various embodiments, the image quality assessment module 230 or the image quality deep learning model 232 can be implemented as one or more of program code, program code executed by processing hardware (e.g., a programmable logic array, a field-programmable gate array, etc.), firmware, or some combination thereof.

In some cases, responsive to determining that the image quality score 236 fulfills the threshold 234, the input image 215 is received by one or more additional modules of the image differentiation system 200, such as the image feature extraction module 240. Additionally or alternatively, responsive to determining that the additional quality score fulfills the threshold 234, the reference image 225 is received by the image feature extraction module 240, or one or more additional modules of the system 200. In FIG. 2, the image feature extraction module 240 applies a trained image deep ranking model 242 to one or more of the input image 215 or the reference image 225. The image deep ranking model 242 is trained to generate a feature vector describing image features of a digital image. For example, the image deep ranking model 242 is trained to generate an input feature vector 245 that describes image features of the input image 215. Additionally or alternatively, the image deep ranking model 242 is trained to generate a reference feature vector 247 that describes image features of the reference image 225. In some cases, the image deep ranking model 242 is trained based on training triplets of digital images, such as training triplets that are selected based on a set of similarity thresholds. The image feature extraction module 240 can include, for example, training feature vectors describing features of digital images included in the training triplets.

In some embodiments, the image deep ranking model 242 includes a multi-branch neural network with one or more convolutional networks that are configured to identify fine-grained features of a digital image, such as the input image 215 or the reference image 225. Additionally or alternatively, the image deep ranking model 242 is trained to identify the fine-grained features of the input image 215 with respect to fine-grained features of the reference image 225. Fine-grained features identified by the deep ranking model 242 can include image features that describe subtle differences between visual characteristics of digital images that depict similar subject matter (e.g., multiple digital images that depict brown leather shoes). As a non-limiting example, the image deep ranking model 242 can include a trained hinge loss model that is applied to the input image 215. For example, the hinge loss model is trained to identify subtle differences between the input image 215 and additional reference images that depict subject matter similar to subject matter depicted in the input image 215. In various embodiments, the image feature extraction module 240 or the image deep ranking model 242 can be implemented as one or more of program code, program code executed by processing hardware (e.g., a programmable logic array, a field-programmable gate array, etc.), firmware, or some combination thereof.

In FIG. 2, the differentiability scoring module 250 receives one or more of the input feature vector 245 and the reference feature vector 247. In some cases, the differentiability scoring module 250 receives additional reference feature vectors associated with additional reference images (e.g., received from the image library 220). The differentiability scoring module 250 is configured to generate a differentiability score 257 that is associated with the input image 215. Additionally or alternatively, the differentiability score 257 indicates an estimated visual difference of the input image 215 with respect to one or more reference images, such as the reference image 225. The differentiability score 257 is based on, for example, a distance between the input feature vector 245 and the reference feature vector 247. In some cases, the differentiability scoring module 250 generates one or more weighting factors associated with respective reference images, such as a weighting factor 252 that is associated with the reference image 225. The weighting factor 252 is based on, for example, user interaction metrics that are associated with the reference image 225, such as user interaction metrics received from the repository 280. Additionally or alternatively, the weighting factor 252 indicates a proportion of user interaction metrics associated with the reference image 225 compared to additional user interaction metrics associated with other reference images in the image library 220. In some cases, the estimated visual difference indicated by the differentiability score 257 is based on differences between the input image 215 and the reference image 225 (e.g., indicated by the distance between feature vectors 245 and 247) weighted by an impact of user interaction metrics associated with the reference image 225 (e.g., indicated by the proportion of user interaction metrics for the reference image 225).

In some embodiments, the differentiability scoring module 250 identifies a differentiated image 255 based on the differentiability score 257. Additionally or alternatively, the input image 215 can be identified as the differentiated image 255 based on the input image 215 having a relatively high differentiation. For example, responsive to determining that the differentiability score 257 fulfills a differentiability threshold (e.g., meets or exceeds the differentiability threshold), the differentiability scoring module 250 identifies that the input image 215 has a sufficiently high differentiation. Additionally or alternatively, responsive to determining that the differentiability score 257 indicates a higher differentiation then additional differentiability scores associated with additional input images, the differentiability scoring module 250 identifies the input image 215 as having the highest differentiation among the additional input images. In some cases, the image differentiation system 200 provides one or more of the differentiated image 255 or the differentiability score 257 to an additional computing system, such as the user computing device 110 or the additional computing system 190. In various embodiments, the differentiability scoring module 250 can be implemented as one or more of program code, program code executed by processing hardware (e.g., a programmable logic array, a field-programmable gate array, etc.), firmware, or some combination thereof.

In some embodiments, the image modification module 260 determines modification data 264 for the differentiated image 255 (e.g., the input image 215). The modification data 264 includes one or more modification recommendations that can adjust the differentiability score 257 associated with the differentiated image 255. The modification data 264 can include, without limitation, one or more of an image modification, a high-differentiability reference image, a differentiability score for the high-differentiability reference image, or any other suitable data describing a recommended modification to the differentiated image 255. For example, the image modification module 260 identifies one or more high-differentiability reference images that have high differentiability scores as compared to the differentiability score 257. Additionally or alternatively, the image modification module 260 identifies an image modification that can be applied to the differentiated image 255. Non-limiting examples of an image modification include a color transformation, a size adjustment, a modification of one or more pixels, or any other suitable modification to at least a portion of the differentiated image 255. In some cases, the image modification module 260 generates a combination image 265 based on a combination of the differentiated image 255 and the image modification. Additionally or alternatively, the image modification module 260 receives (e.g., from the differentiability scoring module 250) a modified differentiability score 267 for the combination image 265. In some cases, the image differentiation system 200 provides one or more of the modification data 264 (or a portion of the data 264), the combination image 265, or the modified differentiability score 267 to an additional computing system, such as the user computing device 110 or the additional computing system 190. In various embodiments, the image modification module 260 can be implemented as one or more of program code, program code executed by processing hardware (e.g., a programmable logic array, a field-programmable gate array, etc.), firmware, or some combination thereof.

Figure 3:
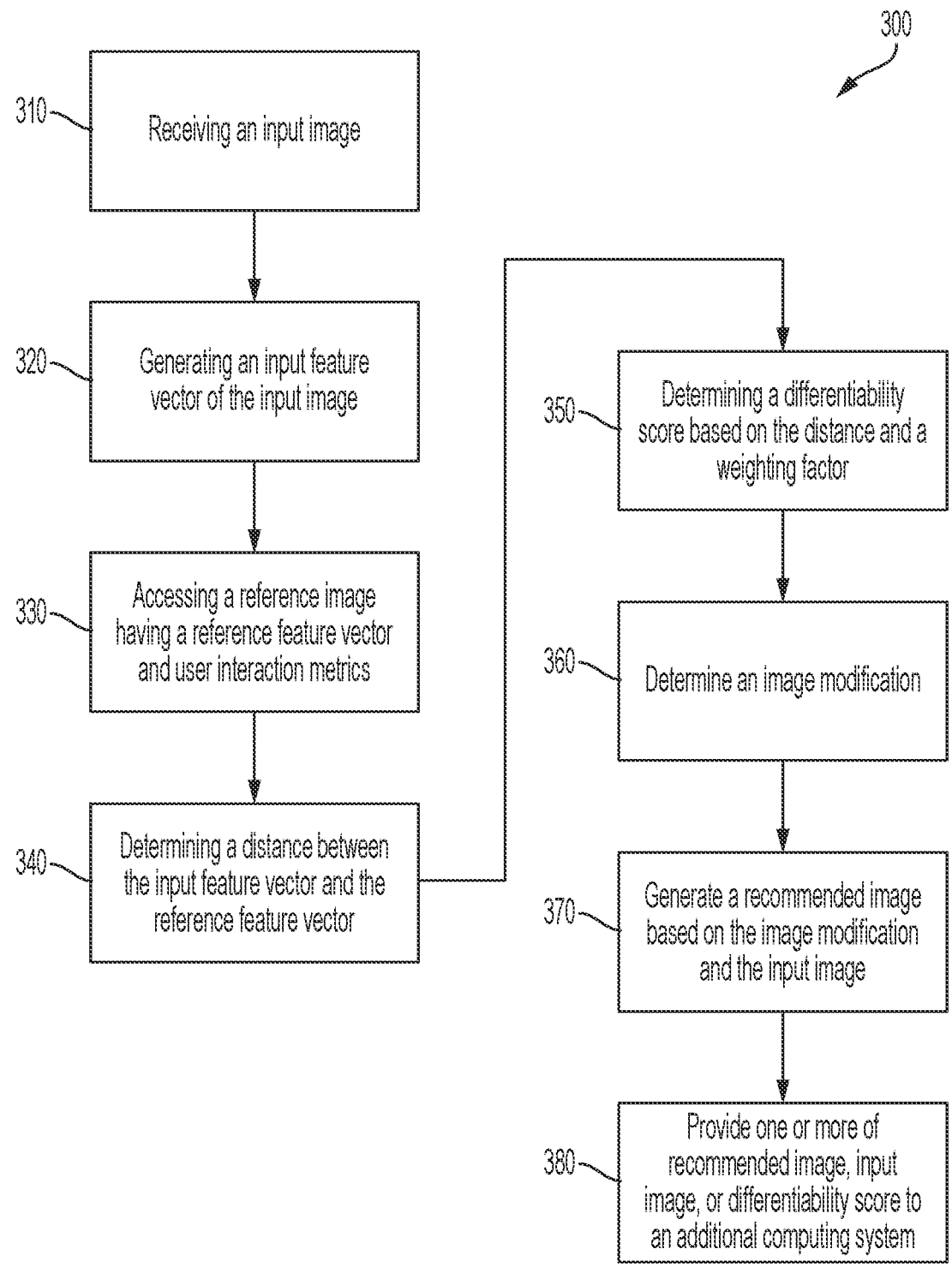
FIG. 3 is a flowchart depicting an example of a process for identifying a differentiated image based on an image modification, according to certain embodiments.

FIG. 3 is a flowchart depicting an example of a process 300 for identifying a differentiated image. In some cases, the process 300 can be used for generating a recommended image based on an image modification determined for the differentiated image. In some embodiments, such as described in regards to FIGS. 1-2, a computing device executing an image differentiation system implements operations described in FIG. 3, by executing suitable program code. For illustrative purposes, the process 300 is described with reference to the examples depicted in FIGS. 1-2. Other implementations, however, are possible. In some embodiments, one or more operations described herein with respect to the process 300 can be used to implement one or more steps for performing a differentiability scoring technique.

At block 310, the process 300 involves receiving at least one input image, such as by an image differentiation system. The input image can be received from an additional computing system. In some cases, the input image is indicated via a user interface of the additional computing system. For example, the image differentiation system 130 receives the group of one or more input images 115 from the user computing device 110. Additionally or alternatively, the group of one or more input images 115 is indicated via the user interface 105. In some cases, the input image is indicated as a candidate image for representing an electronic content item, such as an electronic content item that is available via an online content distribution platform. For example, a group of input images can be indicated (e.g., via a user interface) as candidates for representing one or more electronic content items.

At block 320, the process 300 involves generating an input feature vector that is associated with the input image. In some cases, the input feature vector is generated by applying a feature extraction neural network to the input image, such as a deep ranking model that is trained for feature extraction. For example, the image feature extraction module 240 generates the input feature vector 245 by applying the image deep ranking model 242 to the input image 215. In some cases, a respective input feature vector is generated for each respective input image in a group of input images. For example, if the image differentiation system receives a group of multiple input images, a respective input feature vector can be generated for each particular input image in the group of multiple input images. In some cases, one or more operations described with respect to block 320 can be used to implement a step for generating an input feature vector or a reference feature vector.

At block 330, the process 300 involves accessing at least one reference image. In some cases, the reference image is associated with a reference feature vector. Additionally or alternatively, the reference image is associated with user interaction metrics. For example, the reference image 225 is received (or otherwise accessed) from the image library 220. The reference image 225 is associated with the reference feature vector 247 and with a portion of user interaction metrics from the interaction metrics repository 280. In some cases, the reference feature vector is generated by applying the feature extraction neural network to the reference image. For example, the image feature extraction module 240 may generate the reference feature vector 247 by applying the image deep ranking model 242 to the reference image 225. In some cases, each respective reference image in a group of reference images is associated with a respective reference feature vector and a respective portion of user interaction metrics. For example, if the image differentiation system receives a group of multiple reference images, a respective input feature vector can be generated for each particular reference image in the group of multiple reference images and a respective portion of user interaction metrics can be accessed for each particular reference image.

At block 340, the process 300 involves determining a distance between the input feature vector and the reference feature vector. In some cases, the distance is determined by a differentiability scoring module that is included in the image differentiation system. For example, the differentiability scoring module 250 determines a distance between the input feature vector 245 and the reference feature vector 247. In some cases, a respective distance is determined between each one of multiple input feature vectors and each one of multiple reference feature vectors. For example, if the image differentiation system receives a group of input images and a group of reference images, the differentiability scoring module determines a respective distance between each of the associated input feature vectors and each of the associated reference feature vectors.

At block 350, the process 300 involves determining a differentiability score for the input image based on the distance and a weighting factor, such as a weighting factor associated with one of reference images. For example, the differentiability scoring module determines the differentiability score by applying the weighting factor to the distance. In some cases, the differentiability score can indicate an estimated visual difference of the input image with respect to the reference image. For example, the differentiability scoring module 250 determines the differentiability score 257 for the input image 215 based on the weighting factor 252 and the distance between the feature vectors 245 and 247. In some cases, the input image is identified as a differentiated image based on the differentiability score of the input.

In some cases, the weighting factor is calculated based on the user interaction metrics associated with the reference image. For instance, the differentiability scoring module determines a proportion of user interaction metrics associated with the reference image as compared to user interaction metrics associated with the group of reference images. In some cases, one or more operations described with respect to blocks 340 or 350 can be used to implement one or more steps for determining a distance between an input feature vector and a reference feature vector, determining a weighting factor for user interaction metrics associated with a reference image, determining a differentiability score by applying the weighting factor to the distance, or identifying an input image as a differentiated image.

At block 360, the process 300 involves determining an image modification for the input image. For example, an image modification module included in the image differentiation system determines the image modification. In some cases, the image modification is determined based on one or more of modification data, a high-differentiability reference image, a differentiability score for the high-differentiability reference image, or other suitable data describing a modification recommendation. For example, the image modification module 260 determines the modification data 264 for the differentiated image 255. In some cases, the image modification is determined based on one or more reference images received (or otherwise accessed) by the image differentiation system. In some cases, one or more operations described with respect to block 360 can be used to implement a step for determining an image modification for an input image.

At block 370, the process 300 involves generating a recommended image, such as based on the image modification and the input image. In some cases, the image modification module applies the image modification to the input image. For example, the recommended image can include a combination of the input image and the image modification. Additionally or alternatively, a modified differentiability score is determined for the recommended image. For example, the image modification module 260 generates the combination image 265 based on modification data 264 and the differentiated image 255. In some cases, the image modification module 260 receives, from the differentiability scoring module 250, the modified differentiability score 267 for the combination image 255. In some cases, one or more operations described with respect to block 370 can be used to implement a step for generating a recommended image by applying an image modification to an input image.

At block 380, the process 300 involves providing one or more of the recommended image or the input image to an additional computing system. For example, a user interface (e.g., associated with the additional computing system) is updated to display at least one of the recommended image or the input image that has been identified as a differentiated image. In some cases, one or more of the differentiability score of the input image or the modified differentiability score of the recommended image are provided to the additional computing system. For example, the image differentiation system 200 provides one or more of the input image 215 (e.g., identified as differentiated image 255), the differentiability score 257, the combination image 265, or the modified differentiability score 267 to one or more of the user computing device 110 or the additional computing system 190.

In some embodiments, one or more operations related to one or more of blocks 360, 370, or 380 are optional. For example, an image differentiation system performs one or more of identifying a differentiated image or providing the differentiated image to an additional computing system, without generating or providing modification data or a recommended image.

Figure 4:
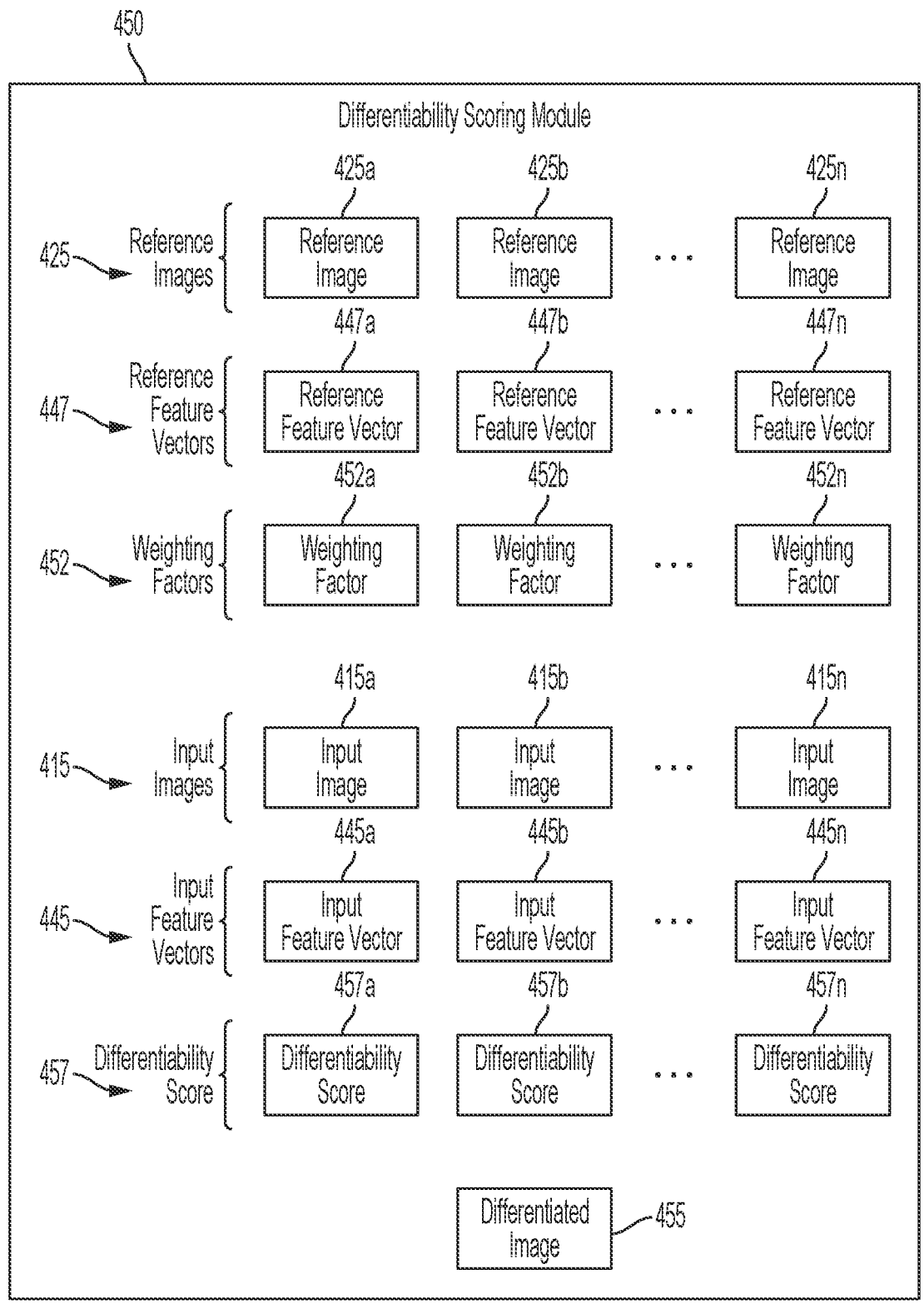
FIG. 4 is a diagram depicting an example of a differentiability scoring module configured to identify a differentiated image, according to certain embodiments.

In some embodiments, a differentiability scoring module that is included in an image differentiation system is configured to calculate a differentiability score for an input image. Additionally or alternatively, the differentiability scoring module is configured to identify a differentiated image, such as from a group of input images. FIG. 4 is a diagram depicting an example of a differentiability scoring module 450. In some embodiments, the differentiability scoring module 450 is included in an image differentiation system, such as the image differentiation system 200.

The differentiability scoring module 450 is configured to receive one or more input images, such as input images 415. The input images 415 include an input image 415a, an input image 415b, and one or more additional input images through an input image 415n (collectively referred to herein as input images 415). In some cases, the input images 415 are received from an additional computing system, such as the user computing device 110. Additionally or alternatively, one or more of the input images 415 are associated with an image quality score. For example, the image quality assessment module 230 determines respective image quality scores for one or more of the input images 415. In some cases, the differentiability scoring module 450 receives the input images 415 responsive to a determination that each of the input images 415 has a respective image quality score that meets or exceeds an image quality threshold, such as the image quality threshold 234.

Additionally or alternatively, the differentiability scoring module 450 is configured to receive one or more reference images, such as reference images 425. The reference images 425 include a reference image 425a, a reference image 425b, and one or more additional reference images through a reference image 425n (collectively referred to herein as reference images 425). In some cases, the reference images 425 are received from a repository of digital images, such as the image library 220. Additionally or alternatively, one or more of the reference images 425 are associated with a reference image quality score, such as respective reference image quality scores determined by the image quality assessment module 230. In some cases, the differentiability scoring module 450 receives the reference images 425 responsive to determination that each of the reference images 425 has a respective reference image quality score that meets or exceeds a reference image quality threshold.

In FIG. 4, each of the input images 415 is associated with a respective input feature vector, such as one of input feature vectors 445, that describes image features of the associated input image. The input feature vectors 445 include an input feature vector 445a, an input feature vector 445b, and one or more additional input feature vectors through an input feature vector 445n (collectively referred to herein as input feature vectors 445). The input feature vectors 445a, 445b, through 445n are associated, respectively, with the input images 415a, 415b, through 415n. Additionally or alternatively, each of the reference images 425 is associated with a respective reference feature vector, such as one of reference feature vectors 447, that describes image features of the associated reference image. The reference feature vectors 447 include a reference feature vector 447a, a reference feature vector 447b, and one or more additional reference feature vectors through a reference feature vector 447n (collectively referred to herein as reference feature vectors 447). The reference feature vectors 447a, 447b, through 447n are associated, respectively, with the reference images 425a, 425b, through 425n. In some cases, one or more of the feature vectors 445 or 447 are determined by a trained feature extraction neural network, such as the image deep ranking model 242 included in the image feature extraction module 240.

In some embodiments, each of the reference images 425 is associated with a portion of user interaction metrics, such as user interaction metrics stored in the interaction metrics repository 280. The differentiability scoring module 450 determines a respective weighting factor, such as one of weighting factors 452, that describes user interaction metrics for the associated reference image. For example, each of the weighting factors 452 indicates a proportion of user interaction metrics for the associated reference image, in comparison to the total user interaction metrics for the group of reference images 425. The weighting factors 452 include a weighting factor 452a, a weighting factor 452b, and one or more additional weighting factors through a weighting factor 452n (collectively referred to herein as weighting factors 452). The weighting factors 452a, 452b, through 452n describe respective portions of user interaction metrics associated with the reference images 425a, 425b, through 425n.

In FIG. 4, the differentiability scoring module 450 calculates one or more differentiability scores, such as differentiability scores 457. Each of the differentiability scores 457 is associated with a respective one of the input images 415. Additionally or alternatively, each of the differentiability scores 457 indicates an estimated visual difference of the respective input image as compared to the reference images 425. The differentiability scores 457 include a differentiability score 457a, a differentiability score 457b, and one or more additional differentiability scores through a differentiability score 457n (collectively referred to herein as differentiability scores 457). The differentiability scores 457a, 457b, through 457n are associated, respectively, with the input images 415a, 415b, through 415n.

In some embodiments, the differentiability scoring module 450 calculates the differentiability scores 457 based on a combination of the weighting factors 452 and distances that are calculated between the input feature vectors 445 and the reference feature vectors 447. A particular differentiability score for a particular input image, for example, is calculated based on a sum of the distances between the input feature vector for that input image and each of the reference feature vectors, weighted by the weighting factors associated with the reference feature vectors. In some cases, the distances between the feature vectors are calculated using a Euclidean distance between a particular input feature vector and a particular reference feature vector.

For example, the differentiability score 457a is calculated based on a first distance between the input feature vector 445a and the reference feature vector 447a, a second distance between the input feature vector 445a and the reference feature vector 447b, and additional distances between the input feature vector 445a and additional reference feature vectors through the reference feature vector 447n. In some cases, the distances between the input feature vector 445a and the various reference feature vectors 447 describes a similarity between image features of the input image 415a and image features of the reference images 425. For example, if the input image 415a is visually similar to the reference image 425a, the first distance will be relatively small, indicating that the input feature vector 445a and the reference feature vector 447a describe visually similar features. Additionally or alternatively, if the input image 415a is visually distinct from the reference image 425b, the second distance will be relatively large, indicating that the input feature vector 445a and the reference feature vector 447b describe visually dissimilar features. In some cases, the differentiability score 457a is calculated based on a sum of the first, second, and additional distances, indicating an overall visual distinctiveness of the input image 415a from the group of reference images 425.

Additionally or alternatively, the differentiability score 457a is calculated based on the weighting factors 452. For example, the first distance is weighted by the weighting factor 452a, the second distance is weighted by the weighting factor 452b, and the additional distances are weighted by additional weighting factors through the weighting factor 452n. In some cases, the weighting factors 452 associated with the reference images 425 modify the distances to the various reference feature vectors 447 based on respective proportions of user interaction metrics associated with the reference images 425. For example, if the reference image 425a has a relatively large portion of associated user interaction metrics (e.g., a large quantity of users interacted with reference image 425a), the weighting factor 452a indicates a relatively high proportion of user interaction metrics for the reference image 425a as compared to the remaining images in the reference images 425. As modified by the weighting factor 452a, the modified first distance between the input feature vector 445a and the reference feature vector 447a indicates that visual features of the reference image 425a could have a relatively high importance to users browsing among the reference images 425. Additionally or alternatively, if the reference image 425b has a relatively small portion of associated user interaction metrics (e.g., a small quantity of users interacted with reference image 425b), the weighting factor 452b indicates a relatively low proportion of user interaction metrics for the reference image 425b as compared to the remaining images in the reference images 425. As modified by the weighting factor 452b, the modified second distance of an input feature vector 445a and the feature vector 447b indicates that visual features of the reference image 425b could have a relatively low importance to users browsing among the reference images 425.

In some embodiments, the differentiability scoring module 450 identifies one or more differentiated images among the input images 415, such as a differentiated image 455. The differentiated image 455 is identified based on the differentiability scores 457. For example, the differentiability scoring module 450 compares the values of the differentiability scores 457. Responsive to determining that a particular differentiability score has a value that fulfills a differentiability criteria, the differentiability scoring module 450 identifies the associated input image as the differentiated image 455. For example, the differentiability scoring module 450 ranks the differentiability scores 457, such as highest to lowest (or lowest to highest). Responsive to determining that the differentiability score 457a has a higher value (e.g., indicating higher differentiability) compared to each of the additional differentiability scores 457, the input image 415a is identified as the differentiated image 455. Additionally or alternatively, the differentiability scoring module 450 compares the different ability scores 457 to a differentiability threshold. Responsive to determining that the differentiability scores 457a and 457b meet or exceed the differentiability threshold (e.g., indicating a differentiability higher than the threshold), the input images 415a and 415b are identified as the differentiated image 455 and an additional differentiated image.

In some cases, a differentiability scoring module, such as the differentiability scoring module 450, determines a differentiability score based on one or more rules-based operations. The rules-based operations include, for example, a mathematical determination of a weighting factor. Equation 1 describes a non-limiting example of a calculation to determine a weighting factor.

$$c_i' = \frac{c_i}{c_1 + c_2 + \cdots c_M} \quad \text{Eq. 1}$$

In Equation 1, a weighting factor $c_i'$ is determined for a reference image i, such as one of the reference images 425. For example, and not by way of limitation, the weighting factor $c_i'$ is associated with the reference image 425a. In Equation 1, the weighting factor $c_i'$ is calculated based on user interaction metrics $c_1$, user interaction metrics $c_2$, and additional user interaction metrics through user interaction metrics $c_M$. In Equation 1, the user interaction metrics $c_i$ are associated with the ith reference image from a group of M reference images, such as the user interaction metrics for the reference image 425a. Additionally or alternatively, the user interaction metrics $c_1$, $c_2$, $c_M$, and the additional user interaction metrics are associated with additional reference images, such as the user interaction metrics for the reference images 425b through 425n. In some cases, the weighting factor $c_i'$ indicates a proportion of user interaction metrics that are associated with the reference image as compared to the sum of user interaction metrics associated with the group of reference images, such as the proportion of the user interaction metrics $c_i$ for reference image 425a compared to the sum of the user interaction metrics $c_1+c_2+\ldots c_M$ for the group of reference images 425.

Additionally or alternatively, the rules-based operations of the differentiability scoring module include, for example, a mathematical determination of distances between an input feature vector and a reference feature vector. Equation 2 describes a non-limiting example of a calculation to determine a distance between feature vectors.

$$D_{ji} = c_i' \frac{\|a_j - b_i\|_2}{\|a_j\|_2} \qquad \text{Eq. 2}$$

In Equation 2, a distance $D_{ji}$ is determined between a feature vector $a_j$ of an input image j and a feature vector $b_i$ of a reference image i. In some cases, the reference image i is included in a group of M reference images, such as described in regards to Equation 1. Additionally or alternatively, the input image j is included in a group of N input images, such as the input images 415. In some cases, the weighting factor $c_i'$ is a weighting factor of the reference image i, such as described in regards to Equation 1. In Equation 2, the mathematical operator $\|\cdot\|_2$ (e.g., an L2 norm) determines a Euclidean distance of the feature vectors being operated upon. For example, the distance $D_{ji}$ is based on a length (e.g., Euclidean distance) of a difference between the feature vector $a_j$ and the feature vector $b_i$. The length of the difference is divided by a length of the feature vector $a_j$. In some cases, dividing the difference by the length of the feature vector $a_j$ normalizes the difference. In Equation 2, the normalized difference is multiplied by the weighting factor $c_i'$.

For example, and not by way of limitation, the input image j corresponds to the input image 415a and the reference image i corresponds to the reference image 425a. In this example, the distance $D_{ji}$ is determined between the feature vector $a_j$ (e.g., the reference feature vector 447a) and the feature vector $b_i$ (e.g., the input feature vector 445a). The length of the difference between the input feature vector 445a and the reference feature vector 447a is normalized by a length of the input feature vector 445a. Additionally or alternatively, the normalized length is weighted by the weighting factor 452a.

In some cases, the differentiability scoring module determines a differentiability score based on a sum of the distances between the input feature vector and each of the reference feature vectors. Equation 3 describes a non-limiting example of a calculation to determine a differentiability score.

$$S_j = D_{j1} + D_{j2} + \ldots D_{jM} \qquad \text{Eq. 3}$$

In Equation 3, a differentiability score $S_j$ of an input image j is calculated as a sum of distances D between a feature vector of the input image j and feature vectors of each reference image i included in a group of M reference images. For example, the differentiability scoring module 450 applies Equation 2 to each of the reference feature vectors 447 with respect to the input feature vector 445a. The first distance D is determined between the input feature vector 445a and the reference feature vector 447a. Additionally or alternatively, the second distance D is determined between the input feature vector 445a and the reference feature vector 447b. In this example, the differentiability score 457a is a sum of the distances D between the input feature vector 445a and the multiple reference feature vectors 447a, 447b, and additional reference feature vectors through 447n.

Figure 5:
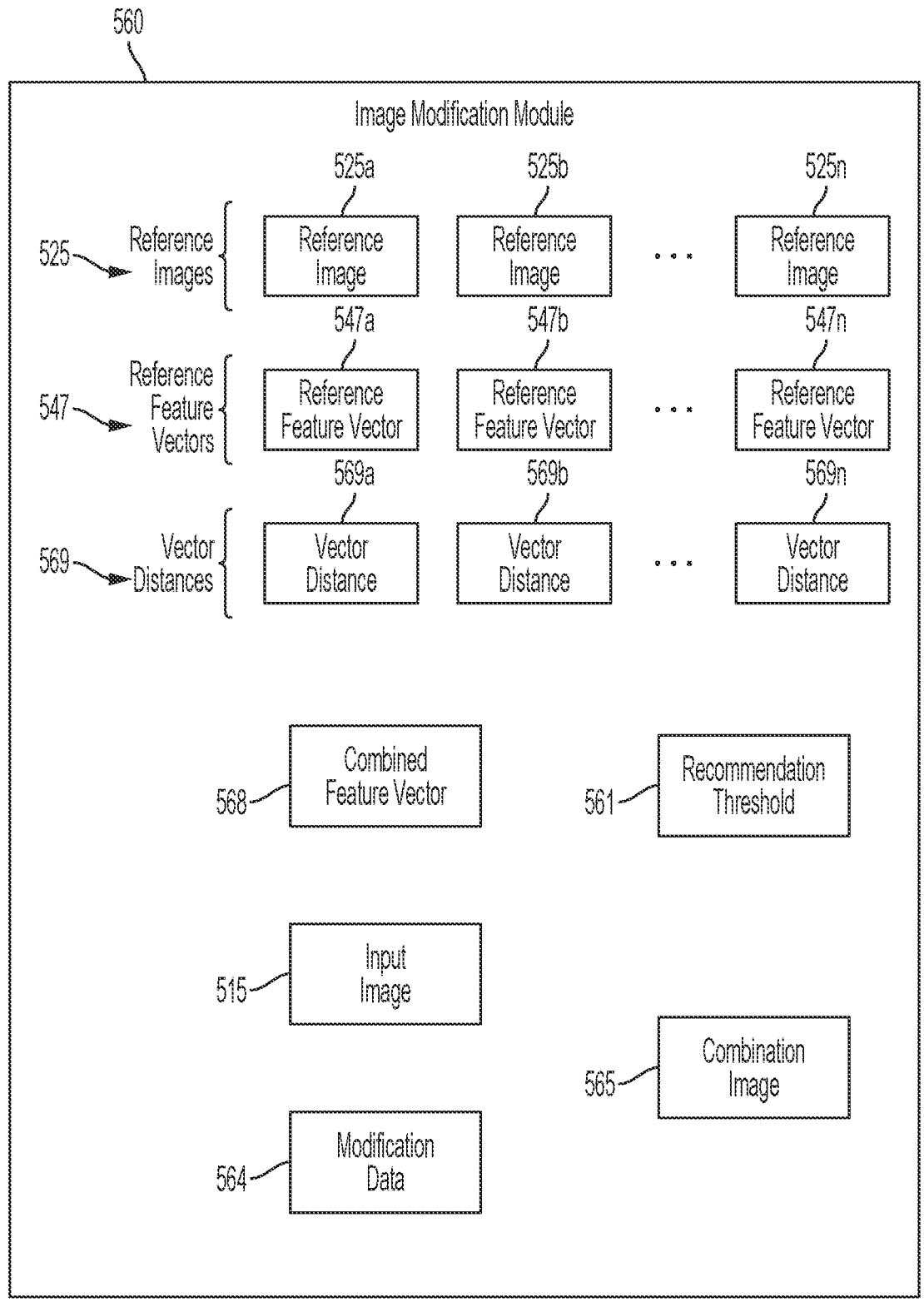
FIG. 5 is a diagram depicting an example of an image modification module configured to determine or generate a modification recommendation for an input image, according to certain embodiments.

In some embodiments, an image modification module that is included in an image differentiation system is configured to determine or generate a modification recommendation for an input image. For example, the image modification module generates image modification data for an input image. FIG. 5 is a diagram depicting an example of an image modification module 560. In some embodiments, the image modification module 560 is included in an image differentiation system, such as the image differentiation system 200.

The image modification module 560 is configured to receive one or more input images, such as an input image 515. In some cases, the input image 515 is received from an additional computing system, such as the user computing device 110. Additionally or alternatively, the input image 515 is identified as a differentiated image, such as the differentiated image 255. In some cases, the image modification module 560 receives the input image 515 responsive to a determination that the input image 515 is identified as a differentiated image.

Additionally or alternatively, the image modification module 560 is configured to receive one or more reference images, such as reference images 525. The reference images 525 include a reference image 525a, a reference image 525b, and one or more additional reference images through a reference image 525n (collectively referred to herein as reference images 525). In some cases, the reference images 525 are received from a repository of digital images, such as the image library 220. Additionally or alternatively, one or more of the reference images 525 are associated with a reference image quality score, or is received by the image modification module 560 responsive to determination that each of the reference images 525 has a respective reference image quality score that meets or exceeds a reference image quality threshold.

In FIG. 5, each of the reference images 425 is associated with a respective reference feature vector, such as one of reference feature vectors 547, that describes image features of the associated reference image. The reference feature vectors 547 include a reference feature vector 547a, a reference feature vector 547b, and one or more additional reference feature vectors through a reference feature vector 547n (collectively referred to herein as reference feature vectors 547). The reference feature vectors 547a, 547b, through 547n are associated, respectively, with the reference images 525a, 525b, through 525n. In some cases, one or more of the feature vectors 547 are determined by a trained feature extraction neural network, such as the image deep ranking model 242 included in the image feature extraction module 240.

In some embodiments, the image modification module 560 determines an average of the reference feature vectors 547. For example, the image modification module 560 determines a combined feature vector 568 that includes multiple feature vectors from the reference feature vectors 547. In some cases, the combined feature vector 568 includes all of the reference feature vectors 547. Additionally or alternatively, the combined feature vector 568 includes a portion of the reference feature vectors 547, such as feature vectors for one or more particular reference images associated with user interaction metrics fulfilling a threshold level of interaction (e.g., meeting or exceeding a threshold quantity of click-throughs).

In FIG. 5, the image modification module 560 determines an average value of the combined feature vector 568. For example, the image modification module 560 calculates a mean value for all feature vectors included in the combined feature vector 568, such as one or more of a centroid or a mean location of the features in the feature space represented by the vector 568. Additionally or alternatively, the image modification module 560 determines a respective vector distance, such as one of vector distances 569, for each of the reference images 525. The vector distances 569 include a vector distance 569*a*, a vector distance 569*b*, and one or more additional vector distances through a vector distance 569*n* (collectively referred to herein as vector distances 569). The vector distances 569*a*, 569*b*, through 569*n* are associated, respectively, with the reference images 525*a*, 525*b*, through 525*n*.

Each of the vector distances 569 determined by the image modification module 560 describes a distance between the respective one of the reference feature vectors 547 and the average value of the combined feature vector 568. For example, the image modification module 560 calculates a Euclidean distance between the mean location of the combined feature vector 568 and a particular reference feature vector, such as the Euclidean distance between feature vectors within the feature space represented by the vector 568. In FIG. 5, the vector distance 569*a* indicates the distance between the reference feature vector 547*a* and the average value of the combined feature vector 568, the vector distance 569*b* indicates the distance between the reference feature vector 547*b* and the average value of the combined feature vector 568, and the vector distance 569*n* indicates the distance between the reference feature vector 547*n* and the average value of the combined feature vector 568.

In some embodiments, the image modification module 560 determines modification data, such as modification data 564 associated with the input image 515, based on one or more of the combined feature vector 568 or the vector distances 569. For example, the image modification module 560 determines one or more of the vector distances 569 having relatively high values, such as by sorting the vector distances 569 or otherwise determining a relationship among the vector distances 569. Responsive to determining one or more of the vector distances 569 having a high value relative to others of the vector distances 569, the image modification module 560 determines an associated one of the reference images 525 that is visually distinct relative to others of the reference images 525. For instance, responsive to determining that the vector distance 569*a* has a largest value compared to the additional ones of the vector distances 569, the image modification module 560 determines that the reference feature vector 547*a* has a greatest distance from the average of the combined feature vector 568. Additionally or alternatively, the image modification module 560 determines that the reference image 525*a*, e.g., associated with the vector distance 569*a*, has a greatest visual distinctiveness of the group of reference images 525.

In FIG. 5, the modification data 564 indicates one or more the reference images 525 based on relationships among the vector distances 569. For example, the modification data 564 includes data indicating a reference image having a greatest visual distinctiveness, such as the example reference image 525*a* associated with the largest vector distance 569*a*. Additionally or alternatively, the modification data 564 includes data indicating multiple reference images that fulfill a recommendation threshold, such as multiple ones of the reference images 525 with respective vector distances 569 that meet or exceed a distance indicated by a recommendation threshold 561.

In some cases, the image modification module 560 generates a combination image 565 based on the input image 515 and the modification data 564. For example, the image modification module 560 identifies one or more features of a reference image indicated by the modification data 564. Additionally or alternatively, the image modification module 560 generates the combination image 565 by modifying the input image 515 to include the identified features. For example, if the example reference image 525*a* (e.g., included in the modification data 564) includes a visual feature of a brightly colored background behind a depiction of a handbag, the image modification module 560 could generate the combination image 565 by modifying the input image 515 to have a brightly colored background.

In some embodiments, the image modification module 560 updates one or more of the vector distances 569, the combined feature vector 568, the modification data 564, or the combination image 565. For example, the image modification module 560 receives an additional reference image, such as an additional image of an electronic content item uploaded (or otherwise added) to the image library 220. Responsive to receiving an indication that the reference images 525 are updated, the image modification module 560 calculates a modified combined feature vector 568, such as a modification that includes a reference feature vector associated with the additional reference image. Additionally or alternatively, the image modification module 560 calculates a modified mean value for the modified combined feature vector 568, such as a mean location of the features, e.g., including the additional reference feature vector, in the feature space represented by the modified vector 568. Furthermore, the image modification module 560 calculates a modified value for each of the vector distances 569, such as modified distances between the respective reference feature vectors, e.g., including the additional reference feature vector, and the modified mean value of the modified combined feature vector 568. In some cases, the image modification module 560 modifies one or more of the modification data 564 or the combination image 565 responsive to determining that the vector distances 569 or the combined feature vector 568 are updates. For example, if the modification to the vector distance 569*b* indicates that the reference feature vector 547*b* is farther from the average value of the modified combination feature vector 568 than the reference feature vector 547*a*, the image modification module 560 can modify the modification data 564 or the combination image 565, such as by indicating a feature of the reference image 525*b* (e.g., in addition to, or instead of, the colorful background feature of the reference image 525*a*).

In some embodiments, an image differentiation system is trained for differentiation analysis of one or more input images. For example, one or more neural networks in the image differentiation system (such as an image deep ranking model or an image quality deep learning model) is trained to extract features of an image or assess an image quality. In some cases, the image differentiation system (or a neural network included in the image differentiation system) is trained based on one or more triplets of training images. Each training image triplet includes, for example, a set of training images that are identified as belonging to a particular class of images, such as a set of training images depicting a particular class of electronic content items (e.g., images depicting black leather shoes). Additionally or alternatively, the set of training images is identified as having a relationship of visual similarity (or visual dissimilarity) among the set of training images, such as similar image features between a first image pair within the set of training images and distinct image features between a second image pair within the set. For convenience and not by way of limitation, a training image triplet that includes a first image pair having visual similarities and a second image pair having visual dissimilarities is referred to as a high-similarity/high-dissimilarity training image triplet. In some cases, a neural network that is trained based on training image triplets with an identified visual similarity relationship is capable of identifying visual distinctions among similar images with improved accuracy. Additionally or alternatively, an image differentiation system that includes the neural network that is trained based on the identified training image triplets performs differentiation analysis more accurately, as compared to an image differentiation system that does not include a neural network trained on training image triplets with an identified visual similarity relationship.

Figure 6:
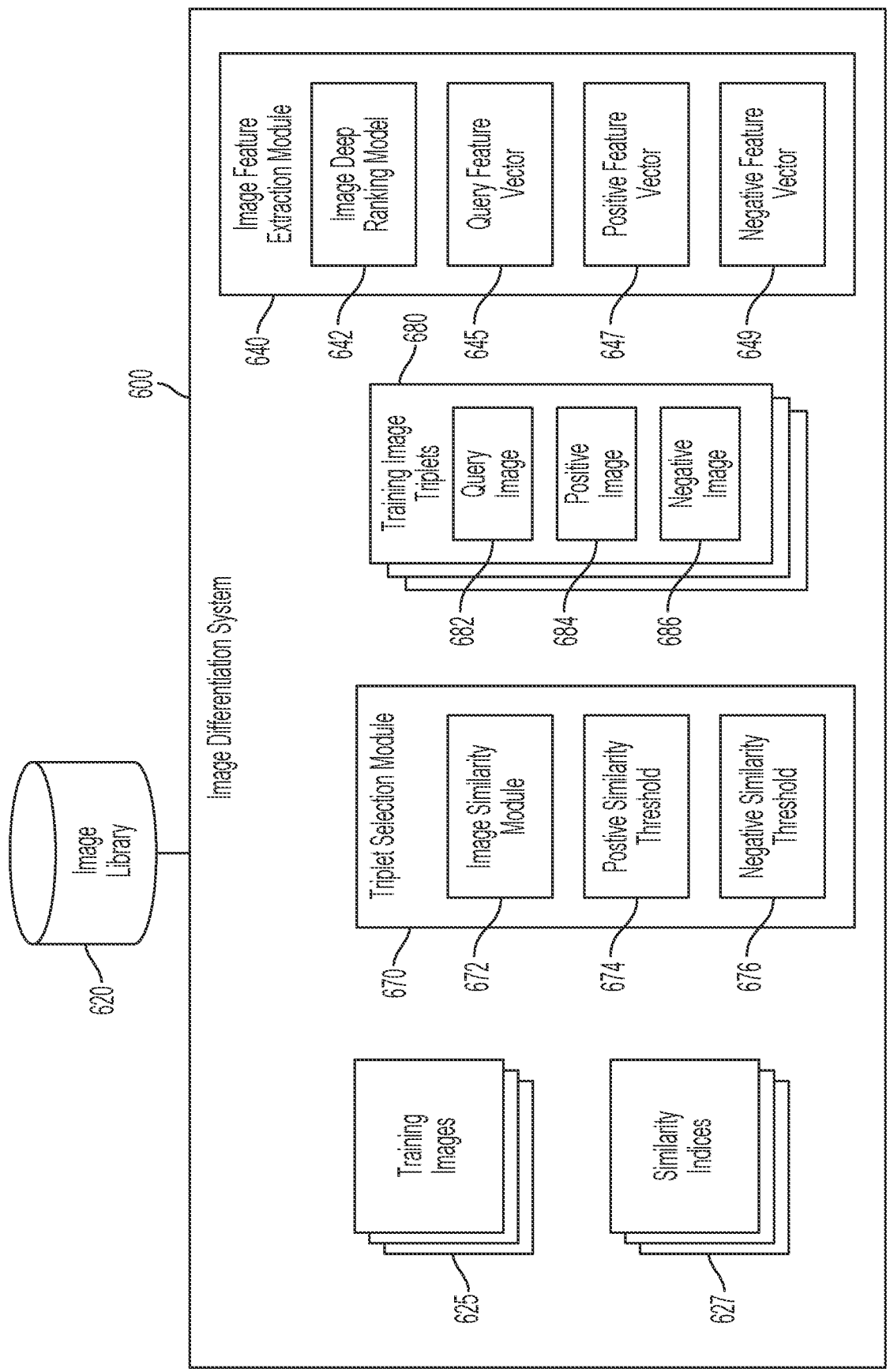
FIG. 6 is a diagram depicting an example of an image differentiation system in which one or more neural networks are trained based on high-similarity/high-dissimilarity training image triplets, according to certain embodiments.

FIG. 6 is a diagram depicting an example of an image differentiation system 600 in which one or more neural networks are trained based on one or more training image triplets, such as training image triplets 680. The image differentiation system 600, or an included neural network, is trained (e.g., via triplet selection techniques described below) to perform differentiation analysis of one or more input images, such as differentiation analysis of the input image 215 as described in regards to FIG. 2. As a non-limiting example, the image differentiation system 200 described in regards to FIG. 2 can be a trained image differentiation system that has been trained based on the training image triplets 680. As an additional non-limiting example, the image differentiation system 600 is an untrained or partially trained image differentiation system that can be configured, subsequent to training, to perform one or more image differentiation techniques as described in one or more of FIGS. 1-5.

In FIG. 6, the image differentiation system 600 includes one or more of an image feature extraction module 640, or a triplet selection module 670. In some embodiments, the image differentiation system 600 includes one or more of an image quality assessment module, a differentiability scoring module, or an image modification module, as described elsewhere herein. In some cases, the image differentiation system 600 is configured to communicate with one or more additional computing systems (e.g., as described in regards to FIG. 1), such as the user computing device 110 or the additional computing system 190.

In some embodiments, the image differentiation system 600 is configured to communicate with one or more image repositories, such as an image library 620. In some cases, the image library 620 includes multiple digital images included in an online content distribution platform, such as a catalog of reference images associated with electronic content items indicating products or services available via the online content distribution platform. Additionally or alternatively, the image library 620 is a training library, such as a collection of images selected for training of neural networks. In some cases, the image differentiation system 600 is configured to communicate with one or more interaction metrics repositories, as described elsewhere herein.

In FIG. 6, the image differentiation system 600 receives one or more groups of training images, such as a group of training images 625. In some cases, the image differentiation system 600 identifies an image quality score associated with one or more of the training images 625. For example, an image quality assessment module included in the image differentiation system 600 applies a trained image quality deep learning model (e.g., the trained image quality deep learning model 232) to one or more of the training images 625. Additionally or alternatively, the image quality scores associated with the training images 625 are compared to an image quality threshold (e.g., the image quality threshold 234). Responsive to determining one or more of the image quality scores that fulfills (e.g., meets or exceeds) the image quality threshold, the image differentiation system 600 determines that the respective associated training image has sufficient quality to be a candidate for a training image. In some cases, the image differentiation system 600 provides one or more particular ones of the training images 625 to the triplet selection module 670 responsive to a determination that the particular training images have respective image quality scores that fulfills the image quality threshold, as described above.

In some embodiments, the triplet selection module 670 receives the training images 625. An image similarity module 672 included in the triplet selection module 670 calculates one or more similarity indices 627 associated with the training images 625. The similarity indices 627 indicate, for example, a similarity between pairs of images, such as by calculating an average, a variance, or a covariance of values (e.g., color values, hue values, luminance values) for pixels included in each pair of images. As a non-limiting example, the image similarity module 672 can calculate a Structural Similarity Index ("SSIM") for each image pair, but other types of similarity indices may be used. In some cases, the similarity indices 627 are calculated based on one or more resized training images, such training images that have had adjustments made to image dimensions. In various embodiments, the triplet selection module 670 or the image similarity module 672 can be implemented as one or more of program code, program code executed by processing hardware (e.g., a programmable logic array, a field-programmable gate array, etc.), firmware, or some combination thereof.

In some cases, the image similarity module 672 calculates a respective one of the similarity indices 627 for one or more pairs of the training images 625. For example, the image similarity module 672 calculates, for each particular one of the training images 625, multiple similarity indices (e.g., a portion of the similarity indices 627) that are associated with the particular training image. Additionally or alternatively, each of the multiple similarity indices associated with the particular training image indicates a respective similarity of the particular training image to a particular additional one of the training images 625. In some cases, the triplet selection module 670 generates a data structure in which the similarity indices 627 are stored. For example, the triplet selection module 670 generates a two-dimensional array in which each row (or column) is associated with a particular one of the training images 625, each row (or column) including values that respectively indicate similarity indices between the particular training image and a particular additional one of the training images 625.

In FIG. 6, the triplet selection module 670 generates one or more of the training image triplets 680 based on the similarity indices 627. For example, the triplet selection module 670 compares each of the similarity indices 627 to a set of similarity thresholds that includes one or more of a positive similarity threshold 674 and a negative similarity threshold 676. The similarity thresholds 674 and 676 indicate, for instance, respective values for visual similarity and visual dissimilarity, such as an example value of 0.9 for the positive similarity threshold 674 or an example value of 0.1 for the negative similarity threshold 676. Additionally or alternatively, the similarity thresholds 674 and 676 indicate respective portions of the similarity indices 627, such as the positive similarity threshold 674 indicating 20% of the similarity indices 627 having the highest values and the negative similarity threshold 676 indicating 20% of the similarity indices 627 having the lowest values. Additional values for the set of similarity thresholds may be used in some embodiments.

Based on the comparison of the similarity indices 627 to the set of similarity thresholds, the triplet selection module 670 identifies a first subset of the similarity indices 627 that indicate a relatively high similarity between respective pairs of images (e.g., the image pair includes pixels having similar values). Each similarity index in the example first subset fulfills the positive similarity threshold 674, such as by equaling or exceeding the positive similarity threshold 674. Additionally or alternatively, the triplet selection module 670 identifies a second subset of the similarity indices 627 that indicate a relatively low similarity between respective pairs of images (e.g., the image pair includes pixels having dissimilar values). Each similarity index in the example second subset fulfills the negative similarity threshold 676, such as by equaling or falling below the negative similarity threshold 676. For convenience and not by way of limitation, a similarity index that fulfills the positive similarity threshold 674 (e.g., within the first subset) is referred to herein as a positive similarity index, and a similarity index that fulfills the negative similarity threshold 676 (e.g., within the second subset) is referred to herein as a negative similarity index.

In some embodiments, the triplet selection module 670 identifies one or more of the training images 625 as query images on which the training image triplets 680 are generated, such as a query image 682 that is included in a particular triplet of the training image triplets 680. The triplet selection module 670 identifies each of the query images in the training image triplets 680 responsive to determining that each of the query images are associated with a respective positive similarity index and a respective negative similarity index. Additionally or alternatively, the triplet selection module 670 identifies a respective positive image and a respective negative image associated with each of the query images, based on the positive similarity indices and the negative similarity indices of the query images. For example, the triplet selection module 670 determines that the query image 682 has a positive similarity index associated with a positive image 684 and a negative similarity index associated with a negative image 686. Responsive to identifying that the query image 682 is associated with the positive image 684 and the negative image 686, the triplet selection module 670 generates a particular triplet (e.g., of the training image triplets 680) that includes the query image 682, the positive image 684, and the negative image 686. In some cases, each triplet of the training image triplets 680 includes a particular query image, a positive image that has a high similarity to the particular query image relevant to other pairs of training images, and a negative image that has a low similarity to the particular query image relevant to other pairs of training images. By applying triplet selection criteria that include comparing the similarity indices 627 to the set of similarity thresholds, e.g., thresholds 674 and 676, the image differentiation system 600 generates the training image triplets 680 based on identified relationships of visual similarity and visual dissimilarity among the set of training images 625. Additionally or alternatively, the training image triplets 680 are generated to include training images that have high visual similarity and also high visual dissimilarity.

In FIG. 6, image differentiation system 600 trains one or more neural networks using the training image triplets 680. For example, the image feature extraction module 640 trains an image deep ranking model 642 using the training image triplets 680. In some embodiments, the image deep ranking model 642 includes a multi-branch neural network with one or more convolutional networks. A first branch of the multi-branch neural network receives the query image 682, a second branch receives the positive image 684, and a third branch receives the negative image 686. Additionally or alternatively, the image deep ranking model 642 includes a hinge loss model that is trainable for identifying fine-grained features of a digital image. In some cases, the image deep ranking model 642 is trained to extract image features of the training image triplets 680, such that, for each triplet, a first distance between a feature vector of the query image and a feature vector of the positive image is less than a second distance between the feature vector of the query images and a feature vector of the negative image. For example, the image deep ranking model 642 is trained to extract a query feature vector 645 associated with the query image 682, a positive feature vector 647 associated with the positive image 684, and a negative feature vector 649 associated with the negative image 686. In this example, the image deep ranking model 642 is trained to identify features such that a first Euclidean distance between the query feature vector 645 and the positive feature vector 647 is less than a second Euclidean distance between the query feature vector 645 and the negative feature vector 649. In some cases, the image deep ranking model 642 is trained to identify features such that a difference between the first Euclidean distance and the second Euclidean distance is minimized. In various embodiments, the image feature extraction module 640 or the image deep ranking model 642 can be implemented as one or more of program code, program code executed by processing hardware (e.g., a programmable logic array, a field-programmable gate array, etc.), firmware, or some combination thereof.

In some embodiments, the image differentiation system 600 includes one or more additional modules that receive feature vectors from the trained image feature extraction module 640. For example, a differentiability scoring module included in the image differentiation system 600 receives feature vectors, such as input feature vectors or reference feature vectors, from the trained image feature extraction module 640. The trained image feature extraction module 640 generates the input feature vectors or reference feature vectors based on fine-grained features extracted from input images or reference images. Additionally or alternatively, the example differentiability scoring module generates one or more differentiability scores indicating estimated visual differences among the input images or the reference images. In some cases, the example differentiability scoring module more accurately identifies the estimated visual differences based on the fine-grained features extracted by the trained image feature extraction module 640. In various embodiments, the example differentiability scoring module or one or more additional modules of the image differentiation system 600 can be implemented as one or more of program code, program code executed by processing hardware (e.g., a programmable logic array, a field-programmable gate array, etc.), firmware, or some combination thereof.

In some cases, a neural network that is trained based on training image triplets having high visual similarity and high visual dissimilarity is able to more accurately extract image features from images belonging to a particular class, as compared to a conventional neural network trained on conventional training image triplets. Additionally or alternatively, the neural network trained based on the high-similarity/high-dissimilarity training image triplets is able to extract more subtle image features as compared to a conventionally trained neural network. For example, subsequent to training using the training image triplets 680, the image deep ranking model 642 extracts, from one or more input images, features that describe subtle visual details of the input images. In some cases, an image differentiation system that includes a neural network that is trained based on high-similarity/high-dissimilarity training image triplets, such as (at least) the image differentiation system 600 or the image differentiation system 200, can more accurately identify visual distinctions among images.

Figure 7:
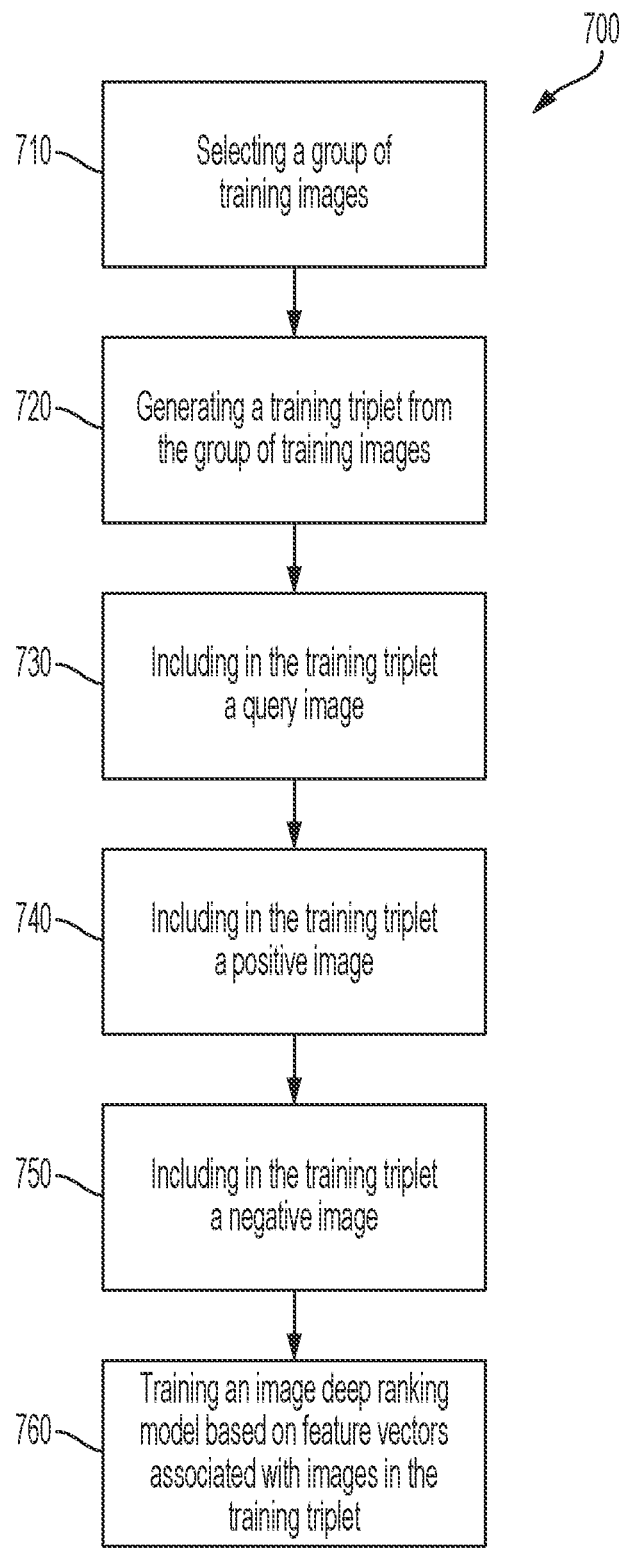
FIG. 7 is a flowchart depicting an example of a process for training a neural network that is included in an image differentiation system, such as training based on high-similarity/high-dissimilarity training image triplets, according to certain embodiments.

FIG. 7 is a flowchart depicting an example of a process 700 for training a neural network included in an image differentiation system. In some cases, the neural network is an image deep ranking model. In some cases, the process 700 can be used for generating one or more training image triplets that have high similarity and high dissimilarity. In some embodiments, such as described in regards to FIGS. 1-6, a computing device executing an image differentiation system implements operations described in FIG. 7, by executing suitable program code. For illustrative purposes, the process 700 is described with reference to the examples depicted in FIGS. 1-6. Other implementations, however, are possible. In some embodiments, one or more operations described herein with respect to the process 700 can be used to implement one or more steps for training an image differentiation system for performing a differentiability scoring technique.

At block 710, the process 700 involves selecting a group of training images. In some embodiments, the training images are received (or otherwise accessed) from a repository of images, such as training images 625 that are received from the image library 620. For example, the training images are received from an image repository associated with an online content distribution platform, such as a catalog of reference images associated with electronic content items. In some cases, one or more of the training images is selected based at least in part on an image quality score associated with a respective image. For example, an image quality assessment module included in the image differentiation system 600 determines image quality scores associated with the training images 625. Additionally or alternatively, the image quality scores associated with the training images 625 are compared to an image quality threshold.

At block 720, the process 700 involves generating one or more training image triplets based on the group of training images. In some cases, each training image triplet is generated based on one or more relationships among similarity indices associated with the group of training images. For example, the image similarity module 672 calculates the similarity indices 627 associated with the training images 625. In some cases, the similarity indices include an SSIM between each image pair, such as an SSIM calculated by the image similarity module 672. Additionally or alternatively, the similarity indices are stored in a data structure, such as a two-dimensional array generated by the triplet selection module 670 (or another suitable component of the image differentiation system 600). In some cases, one or more operations described with respect to blocks 720 can be used to implement a step for generating a training image triplet.

In some embodiments, the one or more training image triplets are generated based on the similarity indices associated with the training images. Additionally or alternatively, the training image triplets are generated based on a comparison of the similarity indices to a set of similarity thresholds. For example, the triplet selection module 670 compares the similarity indices 627 to the positive similarity threshold 674 and the negative similarity threshold 676. Additionally or alternatively, the triplet selection module 670 generates the training image triplets 680 based on training images that fulfill the set of similarity thresholds, such as the query image 682, the positive image 684, and the negative image 686.

At block 730, the process 700 involves including a query image in the training triplet. In some cases, the query image is associated with a query feature vector, such as a query feature vector that includes features of the query image. For example, the image feature extraction module 640 generates the query feature vector 645 based on the query image 682. In some embodiments, the query image is included in the training triplet responsive to determining that the query image has a similarity index that fulfills a particular relationship with respective similarity indices of a positive image and a negative image.

At block 740, the process 700 involves including a positive image in the training triplet. In some embodiments, the positive image is associated with a first similarity index with respect to the query image, such as the positive similarity index of the positive image 684. The first similarity index indicates, for example, a visual similarity of the positive image with respect to the query image. Additionally or alternatively, the positive image is associated with a positive feature vector, such as the positive feature vector 647. For example, the image feature extraction module 640 determines the positive feature vector 647 for the positive image 684.

At block 750, the process 700 involves including a negative image in the training triplet. In some embodiments, the negative image is associated with a second similarity index with respect to the query image, such as the negative similarity index of the negative image 686. The second similarity index indicates, for example, a visual dissimilarity of the negative image with respect to the query image. Additionally or alternatively, the negative image is associated with a negative feature vector, such as the negative feature vector 649. For example, the image feature extraction module 640 determines the negative feature vector 649 for the negative image 686.

In some embodiments, generating a training triplet, such as described in regards to block 720, is based on one or more operations included in at least one of blocks 730, 740, or 750. In some cases, the generated training triplet is a high-similarity/high-dissimilarity training image triplet, such as a high-similarity/high-dissimilarity training image triplet that fulfills multiple criteria of a set of similarity thresholds. For example, the positive image is included in the training triplet responsive to determining that the first similarity index of the positive image fulfills a positive similarity threshold. Additionally or alternatively, the negative image is included in the training triplet responsive to determining that the second similarity index of the negative image fulfills a negative similarity threshold. For example, the triplet selection module 670 determines that the positive image 684 has a positive similarity index (e.g., with respect to the query image 682) that fulfills the positive similarity threshold 674, and that the negative image 686 has a negative similarity index that fulfills the negative similarity threshold 676. Responsive to determining that the similarity indices among the query image 682, the positive image 684, and the negative image 686 fulfill the similarity thresholds 674 and 676, the triplet selection module 670 generates a particular training image triplet that includes the images 682, 684, and 686. In some cases, one or more operations described with respect to blocks 730, 740, or 750 can be used to implement a step for generating a high-similarity/high-dissimilarity training image triplet based on triplet selection criteria.

At block 760, the process 700 involves training an image deep ranking model, such as an image deep ranking model included in an image differentiation system. In some cases, training the image deep ranking model is based on a combination of the query feature vector, the positive feature vector, and the negative feature vector that are associated with the images in the generated training triplet. For example, the image deep ranking model 642 is trained based on the query feature vector 645, the positive feature vector 647, and the negative feature vector 649. In some cases, the image deep ranking model is trained to identify an additional feature vector of an additional image that is received by the image differentiation system. For example, the trained image deep ranking model 642 extracts feature vectors associated with one or more input images, such as the input images 215. In some cases, one or more operations described with respect to blocks 760 can be used to implement a step for training an image deep ranking model (or other neural network) based on high-similarity/high-dissimilarity training image triplets.

Figure 8:
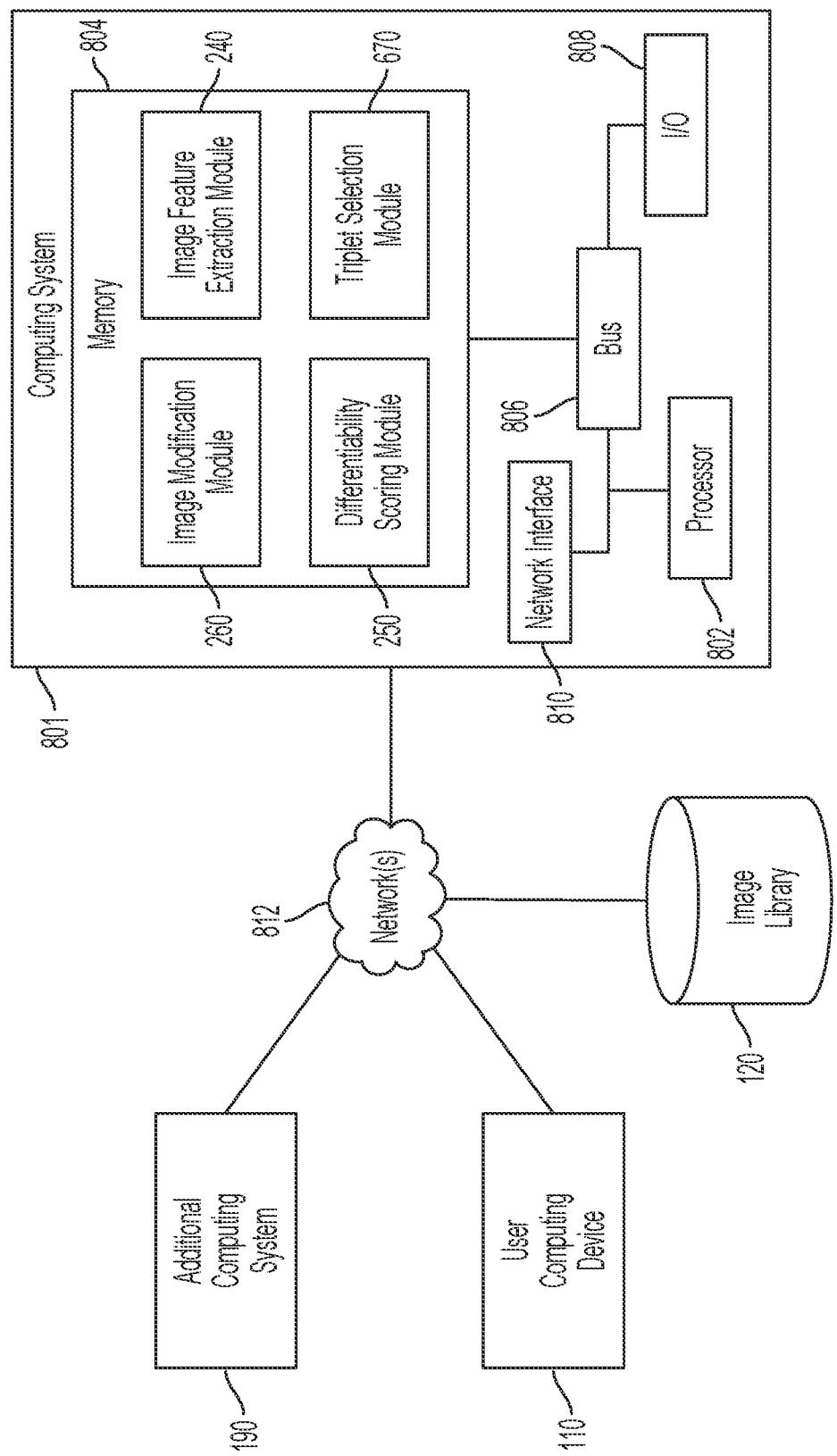
FIG. 8 is a diagram depicting an example of a computing system for implementing an image differentiation system, according to certain embodiments.

Any suitable computing system or group of computing systems can be used for performing the operations described herein. For example, FIG. 8 is a block diagram depicting a computing system capable of implementing an image differentiation system, according to certain embodiments.

The depicted example of a computing system 801 includes one or more processors 802 communicatively coupled to one or more memory devices 804. The processor 802 executes computer-executable program code or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 includes any suitable non-transitory computer-readable medium for storing the image modification module 260, the image feature extraction module 240, the differentiability scoring module 250, the triplet selection module 670, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 801 may also include a number of external or internal devices such as input or output devices. For example, the computing system 801 is shown with an input/output ("I/O") interface 808 that can receive input from input devices or provide output to output devices. A bus 806 can also be included in the computing system 801. The bus 806 can communicatively couple one or more components of the computing system 801.

The computing system 801 executes program code that configures the processor 802 to perform one or more of the operations described above with respect to FIGS. 1-7. The program code includes operations related to, for example, one or more of the image modification module 260, the image feature extraction module 240, the differentiability scoring module 250, the triplet selection module 670, or other suitable applications or memory structures that perform one or more operations described herein. The program code may be resident in the memory device 804 or any suitable computer-readable medium and may be executed by the processor 802 or any other suitable processor. In some embodiments, the program code described above, the image modification module 260, the image feature extraction module 240, the differentiability scoring module 250, and the triplet selection module 670 are stored in the memory device 804, as depicted in FIG. 8. In additional or alternative embodiments, one or more of the image modification module 260, the image feature extraction module 240, the differentiability scoring module 250, the triplet selection module 670, and the program code described above are stored in one or more memory devices accessible via a data network, such as a memory device accessible via a cloud service.

The computing system 801 depicted in FIG. 8 also includes at least one network interface 810. The network interface 810 includes any device or group of devices suitable for establishing a wired or wireless data connection to one or more data networks 812. Non-limiting examples of the network interface 810 include an Ethernet network adapter, a modem, and/or the like. The computing system 801 is able to communicate with one or more of the additional computing system 190, the user computing device 110, or the image library 120 using the network interface 810. Although FIG. 8 depicts the additional computing system 190, the user computing device 110, and the image library 120 as connected to computing system 801 via the networks 812, other embodiments are possible. For example, one or more modules of the additional computing system 190 or the user computing device 110 (e.g., the user interface 105) could run as a program in the memory 804 of the computing system 801. Additionally or alternatively, the image library 120 could include one or more storage components included within the computing system 801, such as a storage component connected via the bus 806.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for identifying a differentiated image for representing an electronic content item, the system comprising:
    an image feature extraction module configured for generating an input feature vector of an input image;
    a differentiability scoring module configured for:
        determining a first distance between the input feature vector and a reference feature vector of a reference image, and
        determining a differentiability score of the input image by applying, to the first distance, a weighting factor that indicates user interactions with the reference image, wherein the differentiability score indicates an estimated visual difference of the input image with respect to the reference image; and
    an image modification module configured for:
        determining a second distance between the reference feature vector and a combined feature vector,
        generating, based on the second distance, image modification data that indicates a particular feature of the reference image,
        determining that the image modification data increases the differentiability score of the input image, and
        generating a recommended image by combining the image modification data with the input image, wherein a modified differentiability score for the recommended image indicates an improved estimated visual difference of the recommended image with respect to the input image.

2. The system of claim 1, further comprising an image quality assessment module configured for calculating an image quality score for the input image by applying a deep learning model to the input image,
    wherein the system is further configured for providing the input image to the image feature extraction module responsive to determining that the image quality score for the input image exceeds an image quality threshold.

3. The system of claim 1, wherein the differentiability scoring module is further configured for:
    generating the weighting factor by calculating a proportion of associated user interaction metrics that describe the user interactions with the reference image to a quantity of total user interaction metrics that describe additional user interactions with a group of multiple reference images, wherein the reference image is included in the group of multiple reference images.

4. The system of claim 1, wherein the differentiability scoring module is further configured for:
    determining an additional distance between the input feature vector and an additional reference feature vector of an additional reference image; and
    applying, to the additional distance, an additional weighting factor that indicates additional user interactions with the additional reference image,
    wherein the combined feature vector is based on a combination of the weighting factor applied to the first distance and the additional weighting factor applied to the additional distance.

5. The system of claim 1, further comprising a training module configured for training a feature extraction neural network of the image feature extraction module based on a training image triplet, wherein the training image triplet includes:
    a query image,
    a positive image having a first similarity index that indicates a visual similarity of the positive image with respect to the query image, and
    a negative image having a second similarity index that indicates a visual dissimilarity of the negative image with respect to the query image,
    wherein the training module is further configured for generating for the training image triplet based on the first similarity index exceeding a positive similarity threshold and the second similarity index being within a negative similarity threshold.

6. The system of claim 5, wherein training the feature extraction neural network comprises:
    determining a third distance between a query feature vector of the query image and a positive feature vector of the positive image;
    determining a fourth distance between the query feature vector and a negative feature vector of the negative image; and
    minimizing a feature extraction model based on a difference between the third distance and the fourth distance.

7. The system of claim 1, wherein the image modification module is further configured for:
    accessing a library of multiple additional reference images, the library including the reference image, wherein each one of the multiple additional reference images has an additional reference feature vector;
    calculating the combined feature vector based on a combination of the additional reference feature vectors;

calculating, for each one of the multiple additional reference images, a recommendation score of the additional reference image, the recommendation score based on an additional distance between the combined feature vector and the additional reference feature vector of the additional reference image; and selecting, from the library, a particular reference image, based on the particular reference image having a particular recommendation score that exceeds a differentiability relationship with additional recommendation scores of the multiple additional reference images, wherein the image modification data is determined based on the particular reference image.

8. A method of identifying a differentiated image for representing an electronic content item, the method comprising:

determining a first distance between an input feature vector of an input image and a reference feature vector of a reference image;

determining a differentiability score of the input image by applying, to the first distance, a weighting factor that indicates user interactions with the reference image, wherein the differentiability score indicates an estimated visual difference of the input image with respect to the reference image;

determining a second distance between the reference feature vector and a combined feature vector;

generating, based on the second distance, image modification data that indicates a particular feature of the reference image;

determining that the image modification data increases the differentiability score of the input image; and generating a recommended image by combining the image modification data with the input image, wherein a modified differentiability score for the recommended image indicates an improved estimated visual difference of the recommended image with respect to the input image.

9. The method of claim 8, further comprising:

generating the weighting factor by calculating a proportion of associated user interaction metrics that describe the user interactions with the reference image to a quantity of total user interaction metrics that describe additional user interactions with a group of multiple reference images, wherein the reference image is included in the group of multiple reference images.

10. The method of claim 8, further comprising:

determining an additional distance between the input feature vector and an additional reference feature vector of an additional reference image; and applying, to the additional distance, an additional weighting factor that indicates additional user interactions with the additional reference image, wherein the combined feature vector is based on a combination of the weighting factor applied to the first distance and the additional weighting factor applied to the additional distance.

11. The method of claim 8, further comprising;

training a feature extraction neural network based on a training image triplet, wherein the training image triplet includes:

a query image, a positive image having a first similarity index that indicates a visual similarity of the positive image with respect to the query image, and a negative image having a second similarity index that indicates a visual dissimilarity of the negative image with respect to the query image, wherein the training image triplet is generated responsive to determining that the first similarity index exceeds a positive similarity threshold and the second similarity index is within a negative similarity threshold.

12. The method of claim 11, further comprising:

determining a third distance between a query feature vector of the query image and a positive feature vector of the positive image;

determining a fourth distance between the query feature vector and a negative feature vector of the negative image; and minimizing a feature extraction model based on a difference between the third distance and the fourth distance.

13. The method of claim 8, further comprising:

accessing a library of multiple additional reference images, the library including the reference image, wherein each one of the multiple additional reference images has an additional reference feature vector;

calculating the combined feature vector based on a combination of the additional reference feature vectors;

calculating, for each one of the multiple additional reference images, a recommendation score of the additional reference image, the recommendation score based on an additional distance between the combined feature vector and the additional reference feature vector of the additional reference image; and selecting, from the library, a particular reference image, based on the particular reference image having a particular recommendation score that exceeds a differentiability relationship with additional recommendation scores of the multiple additional reference images, wherein the image modification data is determined based on the particular reference image.

14. A non-transitory computer-readable medium embodying program code for identifying a differentiated image for representing an electronic content item, the program code comprising instructions which, when executed by a processor, cause the processor to perform operations comprising:

determining a first distance between an input feature vector of an input image and a reference feature vector of a reference image;

determining a differentiability score of the input image by applying, to the first distance, a weighting factor that indicates user interactions with the reference image, wherein the differentiability score indicates an estimated visual difference of the input image with respect to the reference image;

determining a second distance between the reference feature vector and a combined feature vector;

generating, based on the second distance, image modification data that indicates a particular feature of the reference image;

determining that the image modification data increases the differentiability score of the input image;

generating a recommended image by applying combining the image modification data with the input image; and updating a user interface to display at least one of the recommended image or the differentiability score.

15. The non-transitory computer-readable medium of claim 14, the operations further comprising:

determining a modified differentiability score for the recommended image, wherein the modified differentiability score indicates an improved estimated visual difference of the recommended image with respect to the differentiated image.

16. The non-transitory computer-readable medium of claim 14, the operations further comprising:
    accessing a library of multiple additional reference images, the library including the reference image, wherein each one of the multiple additional reference images has an additional reference feature vector;
    calculating the combined feature vector based on a combination of the additional reference feature vectors;
    calculating, for each one of the multiple additional reference images, a recommendation score of the additional reference image, the recommendation score based on an additional distance between the combined feature vector and the additional reference feature vector of the additional reference image; and
    selecting, from the library, a particular reference image, based on the particular reference image having a particular recommendation score that exceeds a differentiability relationship with additional recommendation scores of the multiple additional reference images,
    wherein the image modification data is determined based on the particular reference image.

17. The non-transitory computer-readable medium of claim 14, the operations further comprising:
    calculating an image quality score for the input image by applying a deep learning model to the input image; and
    extracting the input feature vector of the input image responsive to determining that the image quality score for the input image exceeds an image quality threshold.

18. The non-transitory computer-readable medium of claim 14, the operations further comprising:
    generating a training image triplet that includes:
        a query image having a query feature vector,
        a positive image having a positive feature vector, and
        a negative image having a negative feature vector; and
    training, based on a combination of the query feature vector, the positive feature vector, and the negative feature vector, to identify an additional feature vector of an additional image,
    wherein the input feature vector of the input image is extracted based on the training to identify the additional feature vector.

19. The non-transitory computer-readable medium of claim 18, the operations further comprising:
    determining a third distance between the query feature vector and the positive feature vector;
    determining a fourth distance between the query feature vector and the negative feature vector; and
    minimizing a feature extraction model based on a difference between the third distance and the fourth distance.

20. The non-transitory computer-readable medium of claim 18, wherein:
    the positive image has a first similarity index indicating a visual similarity of the positive image with respect to the query image, and
    the negative image has a second similarity index indicating a visual dissimilarity of the negative image with respect to the query image,
    wherein the training image triplet is generated based on the positive image exceeding a positive similarity threshold and the negative image being within a negative similarity threshold.

* * * * *